US012690087B2

(12) United States Patent
Bae et al.

(10) Patent No.: US 12,690,087 B2
(45) Date of Patent: Jul. 21, 2026

(54) METHOD FOR SUPPORTING SIDELINK-RELAY IN SPLIT RAN STRUCTURE

(71) Applicant: Samsung Electronics Co., Ltd., Suwon-si (KR)

(72) Inventors: Beomsik Bae, Suwon-si (KR); Hyunjeong Kang, Suwon-si (KR); Jinwoo Ock, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 18/290,537

(22) PCT Filed: May 10, 2022

(86) PCT No.: PCT/KR2022/006634
§ 371 (c)(1),
(2) Date: Nov. 14, 2023

(87) PCT Pub. No.: WO2022/240127
PCT Pub. Date: Nov. 17, 2022

(65) Prior Publication Data
US 2024/0389181 A1 Nov. 21, 2024

(30) Foreign Application Priority Data
May 14, 2021 (KR) ........................ 10-2021-0062890

(51) Int. Cl.
*H04W 76/20* (2018.01)
*H04W 76/10* (2018.01)
(Continued)

(52) U.S. Cl.
CPC ........... *H04W 76/20* (2018.02); *H04W 76/10* (2018.02); *H04W 92/18* (2013.01); *H04W 92/24* (2013.01)

(58) Field of Classification Search
None
See application file for complete search history.

(56) References Cited

U.S. PATENT DOCUMENTS 9,894,591 B2    2/2018   Chung et al.
10,433,317 B2   10/2019  Park et al.
(Continued)

FOREIGN PATENT DOCUMENTS

EP        3 734 858 A1     11/2020
KR     10-1892121 B1       9/2018
(Continued)

OTHER PUBLICATIONS

3GPP, 3GPP TSG RAN Study on NR sidelink relay (Release 17), 3GPP TR 38.836 V17.0.0, Mar. 29, 2021.
(Continued)

*Primary Examiner* — Suhail Khan
(74) *Attorney, Agent, or Firm* — Jefferson IP Law, LLP

(57) ABSTRACT

The present disclosure relates to a communication technique that merges IoT technology with a 5G communication system for supporting higher data transmission rates than 4G systems, and a system for same. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. Disclosed is a method for a base station, in which a CU and a DU are split, to service a terminal in a mobile communication system.

15 Claims, 36 Drawing Sheets

(51) Int. Cl.
    *H04W 92/18*      (2009.01)
    *H04W 92/24*      (2009.01)

(56)           References Cited

U.S. PATENT DOCUMENTS

| | | | |
|---|---|---|---|
| 11,647,561 | B2 | 5/2023 | Zhu et al. |
| 2020/0337108 | A1 | 10/2020 | Wu et al. |

FOREIGN PATENT DOCUMENTS

| | | |
|---|---|---|
| KR | 10-2083322 B1 | 3/2020 |
| KR | 10-2020-0106938 A | 9/2020 |
| WO | 2020/149718 A1 | 7/2020 |

OTHER PUBLICATIONS

3GPP, 3GPP TSG RAN NG-RAN Architecture description (Release 16), 3GPP TS 38.401 V16.5.0, Apr. 9, 2021.

Ericsson et al., New WID on NR Sidelink Relay', RP-210904, 3GPP TSG RAN Meeting #91-e, Mar. 26, 2021.

3GPP, 3GPP TSG RAN NG-RAN Architecture description (Release 17), 3GPP TS 38.401 V17.0.0, Apr. 2022.

3GPP, 3GPP TSG RAN NG-RAN NG Application Protocol (NGAP) (Release 17), 3GPP TS 38.413 V17.0.0, Apr. 2022.

3GPP, 3GPP TSG RAN NG-RAN F1 application protocol (F1AP) (Releaase 17), 3GPP TS 38.473 V17.0.0, Apr. 2022.

International Search report and written opinion dated Aug. 9, 2022 issued in International Application No. PCT/KR2022/006634.

3GPP, 3rd Generation Partnership Project, Technical Specification Group Radio Access Network, Study on NR sidelink relay (Release 17), 3GPP TR 38.836 V1.0.0, Mar. 2021, 3GPP Draft, R2-2100113, 3RD Generation Partnership Project (3GPP), Mobile Competence Centre, 650, Route Des Lucioles, F-06921 Sophia-Antipolis Cedex, France, Jan. 15, 2021, XP051973329.

3GPP, 3rd Generation Partnership Project, Technical Specification Group Radio Access Network, Study on further enhancements to LTE Device to Device (D2D), User Equipment (UE) to network relays for Internet of Things (IoT) and wearables (Release 15), 3GPP TR 36.746 V0.6.0, May 2017, 3GPP Standard, Technical Report, 3rd Generation Partnership Project (3GPP), Mobile Competence Centre, 650, Route Des Lucioles, F-06921 Sophia-Antipolis Cedex, France, Jun. 24, 2017, pp. 1-36, XP051299036.

Extended European Search Report dated Sep. 17, 2024, issued in European Application No. 22807775.6-1215.

Qualcomm Incorporated, Further discussion adaptation layer of L2 U2N relay, R2-2104742, 3GPP TSG RAN WG2 #114-E, E-Conference, 3GPP server publication date May 11, 2021.

Korean Office Action dated Jun. 9, 2026, issued in Korean Application No. 10-2021-0062890.

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | reject |
| gNB-CU UE F1AP ID | M | | | The gNB-CU UE F1AP ID uniquely identifies the UE association over the F1 interface within the gNB-CU | YES | reject |
| gNB-DU UE F1AP ID | O | | | The gNB-DU UE F1AP ID uniquely identifies the UE association over the F1 interface within the gNB-DU | YES | ignore |
| [...] | | | | | | |
| Sidelink Relay UE Indication | O | | | Indication of the sidelink relay UE | YES | ignore |
| Relay RB to Be Setup List | | 0 ..1 | | | YES | reject |
| >SRB to Be Setup Item IEs | | 1 .. <maxnoofSRBs> | | | EACH | reject |
| >>SRB ID | O | | | Identification of SRB | - | |
| SL DRB to Be Setup List | | 0 ..1 | | | YES | reject |
| >SL DRB to Be Setup Item IEs | | 1 .. <maxnoofSLDRBs> | | | EACH | reject |
| >>SL DRB ID | M | | | Identification of SL DRB | - | |
| >>SL DRB Information | | 1 | | | YES | ignore |
| >>>SL DRB QoS | M | | PC5 QoS Parameters | | - | |
| >>>Flows Mapped to SL DRB Item | | 1 .. <maxnoofPC5QoSFlow s> | | | - | |
| >>>>PC5 QoS Flow Identifier | M | | | This IE uniquely identifies one sidelink QoS flow between the UE and the network | - | |
| >>RLC mode | O | | | This IE indicates the RLC Mode used for a DRB | - | |

FIG. 8AA

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | reject |
| gNB-CU UE F1AP ID | M | | | The gNB-CU UE F1AP ID uniquely identifies the UE association over the F1 interface within the gNB-CU | YES | reject |
| gNB-DU UE F1AP ID | O | | | The gNB-DU UE F1AP ID uniquely identifies the UE association over the F1 interface within the gNB-DU | YES | ignore |
| [...] | | | | | | |
| Relay RB to Be Setup List | | 0 ..1 | | | YES | ignore |
| >Relay SRB to Be Setup Item IEs | | 0 .. <maxnoofSRBs> | | | EACH | reject |
| >>SRB ID | O | | | Identification of SRB | - | |
| >Relay DRB to Be Setup Item IEs | | 0 .. <maxnoofDRBs> | | | EACH | reject |
| >>DRB ID | M | | | Identification of DRB | - | |
| >>CHOICE QoS Information | M | | | | - | |

FIG. 8AB

| | | | | | | |
|---|---|---|---|---|---|---|
| Including DRB QoS related information | | | | | | |
| >>UL UP TNL Information to be setup List | | 1 | | | - | |
| >>>UL UP TNL Information to Be Setup Item IEs | | 1 .. <maxnoofUL UPTNL Infor mation> | | | - | |
| >>>>UL UP TNL Information | M | | UP Transport Layer Information | gNB-CU endpoint of the F1 transport bearer. For delivery of UL PDUs | - | |
| Including other DRB related information | | | | | | |
| Relay RB to Be Modified List | | 0 ..1 | | | YES | reject |
| >Relay DRB to Be Modified Item IEs | | 1 .. <maxnoofD RBs> | | | EACH | reject |
| >>DRB ID | M | | | Identification of DRB | - | |
| >>CHOICE QoS Information | O | | | | - | |
| Including DRB QoS related information | | | | | | |
| >>UL UP TNL Information to be setup List | | 1 | | | - | |
| >>>UL UP TNL Information to Be Setup Item IEs | | 1 .. <maxnoofUL UPTNL Infor mation> | | | - | |

FIG. 8BA

| IE/Group Name | Presence | Range | IE type and reference | Semantics description | Criticality | Assigned Criticality |
|---|---|---|---|---|---|---|
| >>>>UL UP TNL Information | M | | UP Transport Layer Information | gNB-CU endpoint of the F1 transport bearer. For delivery of UL PDUs | - | |
| Including other DRB related information | | | | | | |
| Relay RB to Be Released List | | 0 ..1 | | | YES | reject |
| >Relay SRB To Be Released Item IEs | | 1 .. \<maxnoofSRBs> | | | EACH | reject |
| >>SRB ID | M | | | Identification of SRB | - | |
| >Relay DRB to Be Released Item IEs | | 1 .. \<maxnoofDRBs> | | | EACH | reject |
| >>DRB ID | M | | | Identification of DRB | - | |
| [...] | | | | | | |
| SL DRB to Be Setup List | | 0..1 | | | YES | reject |
| >SL DRB to Be Setup Item IEs | | 1 .. \<maxnoofSLDRBs> | | | EACH | reject |
| >>SL DRB ID | M | | | Identification of SL DRB | - | |
| >>SL DRB Information | | 1 | | | YES | ignore |
| >>>SL DRB QoS | M | | PC5 QoS Parameters | | - | |
| >>>Flows Mapped to SL DRB Item | | 1 .. \<maxnoofPC5QoSFlows> | | | - | |
| >>>>PC5 QoS Flow dentifier | M | | | This IE uniquely identifies one sidelink QoS flow between the UE and the network | - | |
| >>RLC mode | O | | | This IE indicates the RLC Mode used for a DRB | - | |

FIG. 8BB

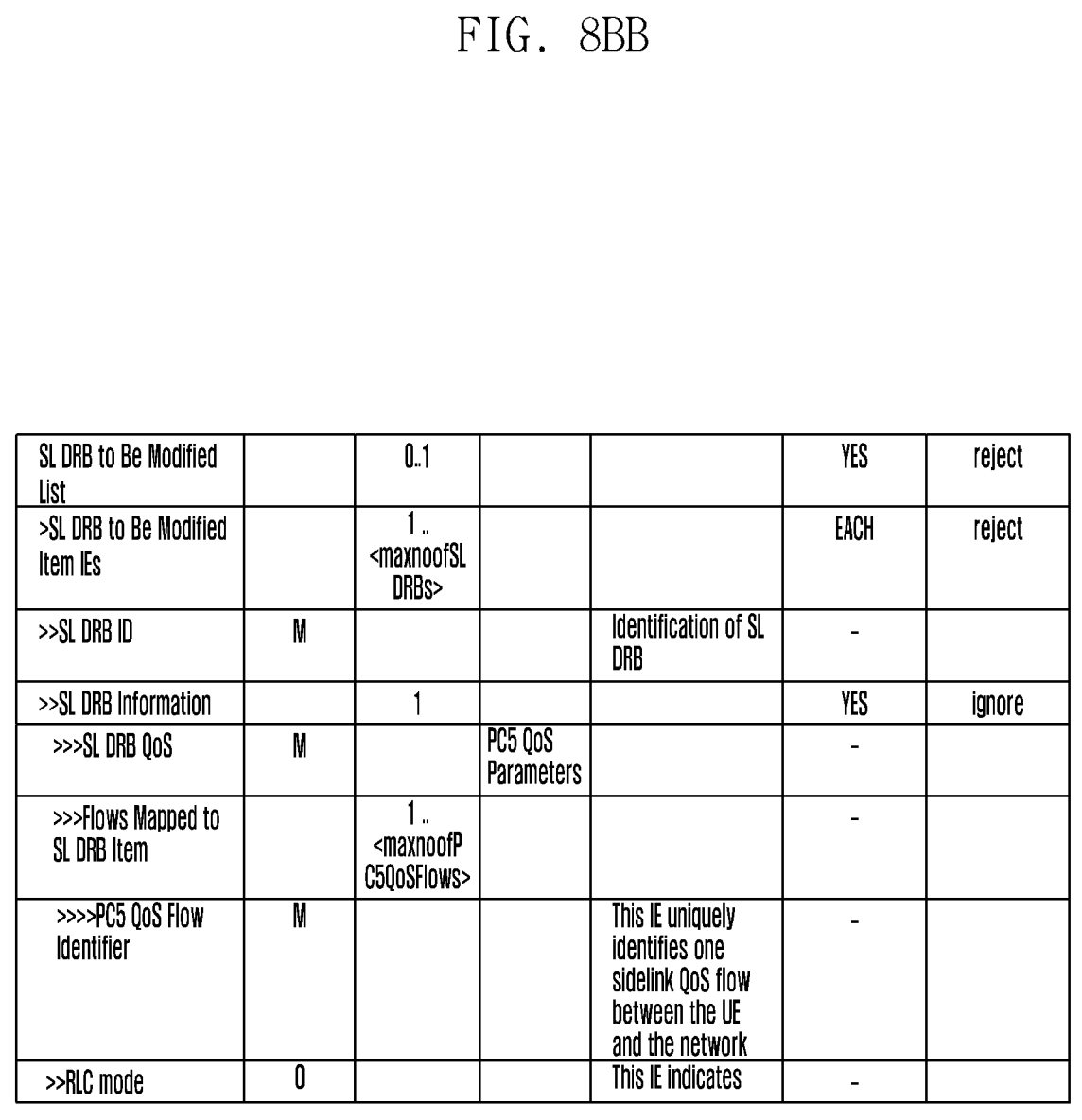

| | | | | | | |
|---|---|---|---|---|---|---|
| SL DRB to Be Modified List | | 0..1 | | | YES | reject |
| >SL DRB to Be Modified Item IEs | | 1 .. \<maxnoofSL DRBs> | | | EACH | reject |
| >>SL DRB ID | M | | | Identification of SL DRB | - | |
| >>SL DRB Information | | 1 | | | YES | ignore |
| >>>SL DRB QoS | M | | PC5 QoS Parameters | | - | |
| >>>Flows Mapped to SL DRB Item | | 1 .. \<maxnoofP C5QoSFlows> | | | - | |
| >>>>PC5 QoS Flow Identifier | M | | | This IE uniquely identifies one sidelink QoS flow between the UE and the network | - | |
| >>RLC mode | O | | | This IE indicates | - | |

FIG. 8C

| IE/Group Name | Presence | Range | IE type and reference | Semantics description | Criticality | Assigned Criticality |
|---|---|---|---|---|---|---|
| | | | | the RLC Mode used for a DRB | | |
| SL DRB to Be Released List | | 0..1 | | | YES | reject |
| >SL DRB to Be Released Item IEs | | 1 .. \<maxnoofSL DRBs> | | | EACH | reject |
| >>SL DRB ID | M | | | Identification of SL DRB | - | |
| [...] | | | | | | |
| Relay RB Mapping Information | | 0..1 | | | YES | reject |
| >Relay RB Mapping Information Added List Item | | 0.. \<maxnoofRo utingEntries > | | | EACH | ignore |
| >>Remote UE ID | M | | | Identification of Remote UE | - | |
| >>RB ID | O | | | Identification of SRB or DRB | | |
| >>Relay RB ID | M | | | Indicates the BAP address of the next hop IAB-node or IAB-donor-DU | - | |
| >Relay RB Mapping Information Modified List Item | | 0.. \<maxnoofRo utingEntries > | | | EACH | ignore |
| >>Remote UE ID | M | | | Identification of Remote UE | - | |
| >>RB ID | O | | | Identification of SRB or DRB | - | |
| >>Relay RB ID | M | | | Indicates the BAP address of the next hop IAB-node or IAB-donor-DU | - | |
| >Relay RB Mapping Information Removed List Item | | 0.. \<maxnoofRo utingEntries > | | | EACH | ignore |
| >>Remote UE ID | M | | | Identification of Remote UE | - | |
| >>RB ID | O | | | Identification of SRB or DRB | - | |
| [...] | | | | | | |

FIG. 9

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | reject |
| gNB-CU UE F1AP ID | M | | | The gNB-CU UE F1AP ID uniquely identifies the UE association over the F1 interface within the gNB-CU | YES | reject |
| gNB-DU UE F1AP ID | M | | | The gNB-DU UE F1AP ID uniquely identifies the UE association over the F1 interface within the gNB-DU | YES | reject |
| DU To CU RRC Information | M | | | This IE contains the RRC Information that are sent from the gNB-DU to the gNB-CU | YES | reject |
| [...] | | | | | | |

(a) F1 UE CONTEXT SETUP/MODIFICATION RESPONSE MESSAGE

| IE/Group Name | Presence | Range | IE type and reference | Semantics description | Criticality | Assigned Criticality |
|---|---|---|---|---|---|---|
| [...] | | | | | | |
| SL-PHY-MAC-RLC-Config | O | | OCTET STRING | SL-PHY-MAC-RLC-Config | YES | ignore |
| [...] | | | | | | |
| Relay RB-Config | O | | OCTET STRING | Relay RB-Config | YES | ignore |

(b) DU To CU RRC Information IE

FIG. 10

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | ignore |
| gNB-DU UE F1AP ID | M | | | The gNB-DU UE F1AP ID uniquely identifies the UE association over the F1 interface within the gNB-DU | YES | reject |
| Remote UE ID | M | | | Identification of Remote UE | YES | reject |
| RRC-Container | M | | | Includes the UL-CCCH-Message IE or UL-CCCH1- Message IE | YES | reject |
| [...] | | | | | | |

(a) INITIAL UL RELAY RRC MESSAGE TRANSFER

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | ignore |
| gNB-CU UE F1AP ID | M | | | The gNB-CU UE F1AP ID uniquely identifies the UE association over the F1 interface within the gNB-CU | YES | reject |
| gNB-DU UE F1AP ID | M | | | The gNB-DU UE F1AP ID uniquely identifies the UE association over the F1 interface within the gNB-DU | YES | reject |
| Remote UE ID | M | | | Identification of Remote UE | YES | reject |
| SRB ID | M | | | Identification of SRB | YES | reject |
| RRC-Container | M | | | Includes the DL-DCCH-Message IE encapsulated in a PDCP PDU, or the DL-CCCH- Message IE | YES | reject |

(b) UL/DL RELAY RRC MESSAGE TRANSFER

FIG. 11

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | ignore |
| RAN UE NGAP ID | M | | | This IE uniquely identifies the UE association over the NG interface within the NG-RAN node | YES | reject |
| [...] | | | | | | |
| Remote UE Indication | O | | ENUMERATED [true, ...] | Indication of an Remote UE | YES | reject |
| [...] | | | | | | |

NG INITIAL UE MESSAGE

FIG. 12

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | ignore |
| AMF UE NGAP ID | M | | | This IE uniquely identifies the UE association over the NG interface | YES | reject |
| RAN UE NGAP ID | M | | | This IE uniquely identifies the UE association over the NG interface within the NG-RAN node | YES | reject |
| [···] | | | | | | |
| Remote UE Service Authorized | 0 | | ENUMERATED (authorized, not authorized, ...) | Indicates the Remote UE service authorization status | YES | ignore |
| [···] | | | | | | |

NG INITIAL CONTEXT SETUP REQUEST

FIG. 13AA

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | reject |
| gNB-CU UE F1AP ID | M | | | The gNB-CU UE F1AP ID uniquely identifies the UE association over the F1 interface within the gNB-CU | YES | reject |
| gNB-DU UE F1AP ID | O | | | The gNB-DU UE F1AP ID uniquely identifies the UE association over the F1 interface within the gNB-DU | YES | ignore |
| Remote UE ID | M | | | Identification of Remote UE | YES | reject |
| UE-CapabilityRAT-ContainerList | O | | OCTET STRING | This IE is used in the NG-RAN and it consists of the UE-CapabilityRAT-ContainerList | | |
| SL DRB to Be Setup List | | 0..1 | | | YES | reject |
| >SL DRB to Be Setup Item IEs | | 1 .. <maxnoofSL DRBs> | | | EACH | reject |
| >> SL DRB ID | M | | | Identification of SL DRB | - | |
| >> SL DRB Information | | 1 | | | YES | ignore |
| >>>SL DRB QoS | M | | PC5 QoS Parameters | | - | |
| >>>Flows Mapped to SL DRB Item | | 1 .. <maxnoofP C5QoSFlows> | | | - | |

FIG. 13AB

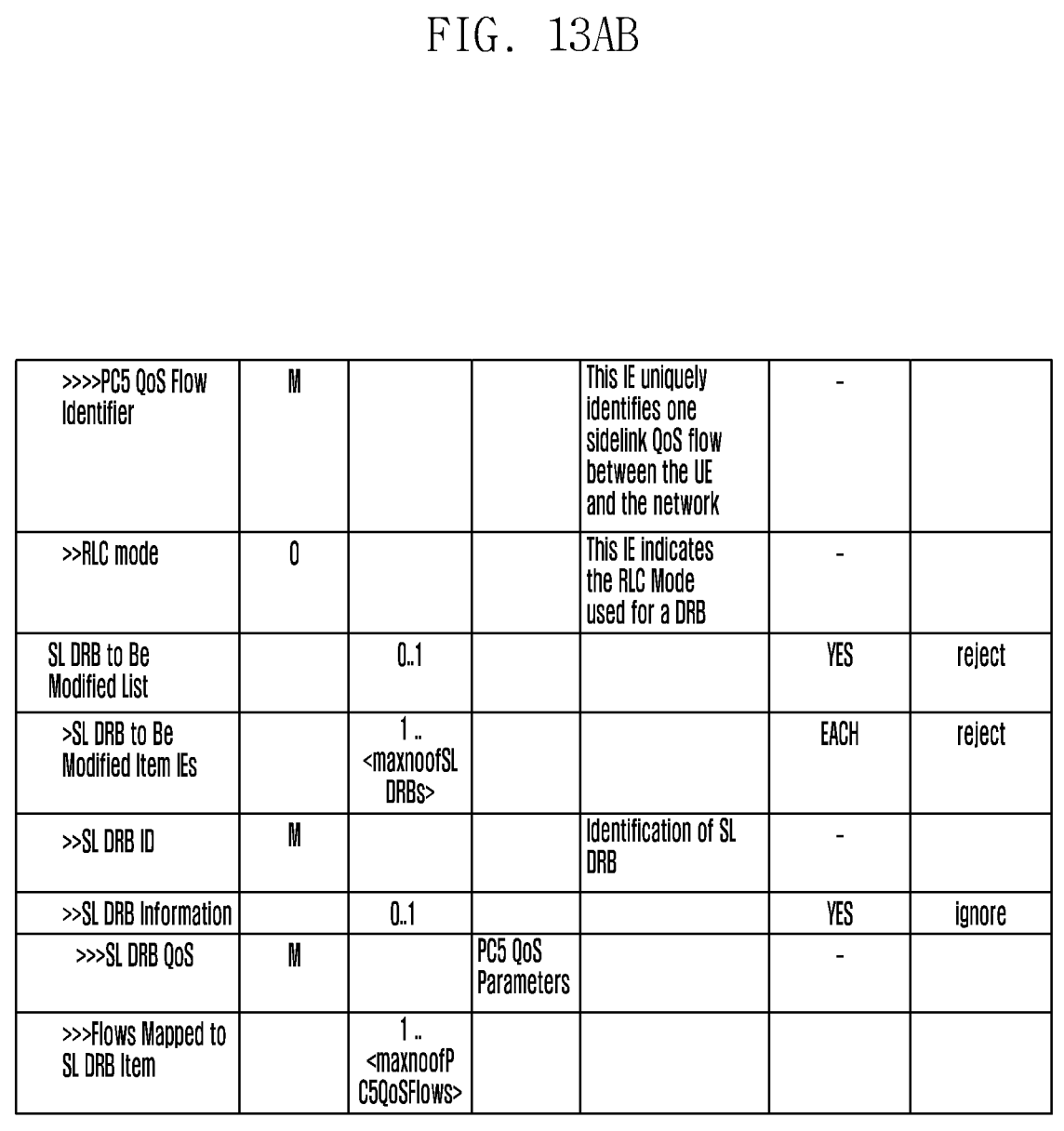

| >>>>PC5 QoS Flow Identifier | M | | | This IE uniquely identifies one sidelink QoS flow between the UE and the network | - | |
| >>RLC mode | O | | | This IE indicates the RLC Mode used for a DRB | - | |
| SL DRB to Be Modified List | | 0..1 | | | YES | reject |
| >SL DRB to Be Modified Item IEs | | 1 .. <maxnoofSL DRBs> | | | EACH | reject |
| >>SL DRB ID | M | | | Identification of SL DRB | - | |
| >>SL DRB Information | | 0..1 | | | YES | ignore |
| >>>SL DRB QoS | M | | PC5 QoS Parameters | | - | |
| >>>Flows Mapped to SL DRB Item | | 1 .. <maxnoofP C5QoSFlows> | | | | |

FIG. 13B

| IE/Group Name | Presence | Range | IE type and reference | Semantics description | Criticality | Assigned Criticality |
|---|---|---|---|---|---|---|
| | | | | sidelink QoS flow between the UE and the network | - | |
| >>RLC mode | 0 | | | This IE indicates the RLC Mode used for a DRB | - | |
| SL DRB to Be Released List | | 0..1 | | | YES | reject |
| >SL DRB to Be Released Item IEs | | 1 .. <maxnoofSL DRBs> | | | EACH | reject |
| >>SL DRB ID | M | | | Identification of SL DRB | - | |
| [...] | | | | | | |

F1 REMOTE UE CONTEXT SETUP/MODIFICATION REQUEST MESSAGE

FIG. 14

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | reject |
| gNB-CU UE F1AP ID | M | | | The gNB-CU UE F1AP ID uniquely identifies the UE association over the F1 interface within the gNB-CU | YES | reject |
| gNB-DU UE F1AP ID | M | | | The gNB-DU UE F1AP ID uniquely identifies the UE association over the F1 interface within the gNB-DU | YES | ignore |
| Remote UE ID | M | | | Identification of Remote UE | YES | reject |
| DU To CU RRC Information | M | | | This IE contains the RRC Information that are sent from the gNB-DU to the gNB-CU | YES | reject |
| [...] | | | | | | |

(a) F1 REMOTE UE CONTEXT SETUP/MODIFICATION RESPONSE MESSAGE

| IE/Group Name | Presence | Range | IE type and reference | Semantics description | Criticality | Assigned Criticality |
|---|---|---|---|---|---|---|
| [...] | | | | | | |
| SL-PHY-MAC-RLC-Config | O | | OCTET STRING | SL-PHY-MAC-RLC-Config | YES | ignore |
| [...] | | | | | | |

(b) DU To CU RRC Information IE

FIG. 15

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | reject |
| gNB-CU UE F1AP ID | M | | | The gNB-CU UE F1AP ID uniquely identifies the UE association over the F1 interface within the gNB-CU | YES | reject |
| gNB-DU UE F1AP ID | O | | | The gNB-DU UE F1AP ID uniquely identifies the UE association over the F1 interface within the gNB-DU | YES | ignore |
| [...] | | | | | | |
| Relay RB Mapping Information | | 0..1 | | | YES | reject |
| >Relay RB Mapping Information Added List Item | | 0.. <maxnoofRoutingEntries> | | | EACH | ignore |
| >>Remote UE ID | M | | | Identification of Remote UE | - | |
| >>DRB ID | O | | | Identification of DRB | | |
| >>Relay RB ID | M | | | Indicates the BAP address of the next hop IAB-node or IAB-donor-DU | - | |
| >Relay RB Mapping InformationModified List Item | | 0.. <maxnoofRoutingEntries> | | | EACH | ignore |
| >>Remote UE ID | M | | | Identification of Remote UE | - | |
| >>DRB ID | O | | | Identification of DRB | | |
| >>Relay RB ID | M | | | Indicates the BAP address of the next hop IAB-node or IAB-donor-DU | - | |
| >Relay RB MappingInformation RemovedList Item | | 0.. <maxnoofRoutingEntries> | | | EACH | ignore |
| >>Remote UE ID | M | | | Identification of Remote UE | - | |
| >>DRB ID | O | | | Identification of DRB | | |
| [...] | | | | | | |

FIG. 21

| IE/Group Name | Presence | Range | IE type and reference | Semantics description | Criticality | Assigned Criticality |
|---|---|---|---|---|---|---|
| Message Type | M | | | The Message Type IE uniquely identifies the message being sent | YES | ignore |
| gNB-DU UE F1AP ID | M | | | The gNB-DU UE F1AP ID uniquely identifies the UE association over the F1 interface within the gNB-DU | YES | reject |
| [···] | | | | | | |
| Remote UE ID | O | | | Identification of Remote UE | YES | reject |

FIG. 22

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| [...] | | | | | | |
| Remote UE ID | O | | | Identification of Remote UE | YES | reject |
| [...] | | | | | | |

METHOD FOR SUPPORTING SIDELINK-RELAY IN SPLIT RAN STRUCTURE

CROSS-REFERENCE TO RELATED APPLICATION(S)

This application is a U.S. National Stage application under 35 U.S.C. § 371 of an International application number PCT/KR2022/006634, filed on May 10, 2022, which is based on and claims the benefit of a Korean application number 10-2021-0062890, filed on May 14, 2021, in the Korean Patent and Trademark Office, the disclosure of which is incorporated by reference herein in its entirety.

TECHNICAL FIELD

The disclosure relates to a split structure base station, a terminal communicating therewith, and a method and device for operating a core network in a mobile communication system.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post long term evolution (LTE) system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) schemes; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, technologies such as a sensor network, machine to machine (M2M), and machine type communication (MTC) have been implemented by the technique of beamforming, MIMO, and array antenna, which are 5G communication technologies. Application of a cloud RAN as the foregoing big data processing technology may be an example of convergence of 5G technology and IoT technology.

In 5G, as an amount of data processing required in a wireless communication process increases explosively, technology that separates protocol layers in the existing base station into a central unit (CU) and a distributed unit (DU) is introduced; thus, a method for terminals and a base station with separate CUs and DUs to communicate needs to be defined.

DISCLOSURE OF INVENTION

Technical Problem

The disclosure provides a method in which a remote user terminal (remote UE) receives a mobile communication network service by connecting communication with a mobile communication network through connection with a relay support terminal (relay UE) in a mobile communication system in which functions within a base station are separated into a central unit (CU) and a distributed unit (DU).

Further, the disclosure provides a method of transmitting and processing control information between a CU and a DU for enabling transmission of control plane signaling and user plane data between a remote UE and a base station.

Solution to Problem

According to an embodiment of the disclosure to solve the above problems, a method performed by a distributed unit (DU) of a base station in a communication system may include receiving, from a first terminal, a radio resource control (RRC) configuration request message of a second terminal; allocating a DU identifier (ID) for the second terminal based on the RRC setup request message; transmitting, to a central unit (CU) of the base station, a first message including a DU ID for the second terminal and the RRC setup request message; and receiving, from the CU, a second message including a CU ID for the second terminal and an RRC setup message corresponding to the RRC setup request message based on the first message, wherein the DU ID for the second terminal and the CU ID for the second terminal may be configured to identify terminal association through an F1 interface.

Further, according to an embodiment of the disclosure, a method performed by a central unit (CU) of a base station in a communication system may include receiving, from a distributed unit (DU) of the base station, a first message including a DU ID for a second terminal connected to a first terminal and a radio resource control (RRC) configuration request message of the second terminal; allocating a CU ID for the second terminal based on the first message; and transmitting, to the DU, a second message including a CU ID for the second terminal and an RRC setup message corresponding to the RRC setup request message, wherein the DU ID for the second terminal and the CU ID for the second terminal may be configured to identify terminal association through an F1 interface.

Further, according to an embodiment of the disclosure, a distributed unit (DU) of a base station in a communication system may include a transceiver; and a controller configured to control the transceiver to receive, from a first terminal, a radio resource control (RRC) configuration request message of a second terminal, to allocate a DU identifier (ID) for the second terminal based on the RRC setup request message, to control the transceiver to transmit, to a central unit (CU) of the base station, a first message including a DU ID for the second terminal and the RRC setup request message, and to control the transceiver to receive, from the CU, a second message including a CU ID for the second terminal and an RRC setup message corresponding to the RRC setup request message based on the first message, wherein the DU ID for the second terminal and the CU ID for the second terminal may be configured to identify terminal association through an F1 interface.

Further, according to an embodiment of the disclosure, a central unit (CU) of a base station in a communication system may include a transceiver; and a controller configured to control the transceiver to receive, from a distributed unit (DU) of the base station, a first message including a DU ID for a second terminal connected to the first terminal and a radio resource control (RRC) configuration request message of the second terminal, to allocate a CU ID for the second terminal based on the first message, and to control the transceiver to transmit, to the DU, a second message including a CU ID for the second terminal and an RRC setup message corresponding to the RRC setup request message, wherein the DU ID for the second terminal and the CU ID for the second terminal may be configured to identify terminal association through an F1 interface.

Advantageous Effects of Invention

According to an embodiment of the disclosure, it is possible to efficiently perform signaling transmission and reception for configuration and communication for a relay UE and a remote UE in a base station where a CU and a DU are separated.

BRIEF DESCRIPTION OF DRAWINGS

FIG. 2C is a signal flow diagram illustrating a procedure of using UE-association signaling between a CU and a DU for a relay UE according to an embodiment of the disclosure.

FIG. 2D is a signal flow diagram illustrating a procedure of using UE-association signaling between a CU and a DU for a relay UE according to an embodiment of the disclosure.

FIG. 7 is a diagram illustrating an example of an F1 or W1 message including configuration information for communication with a relay UE according to an embodiment of the disclosure.

FIG. 8AA is a diagram illustrating an example of a message for updating configuration information for communication with a relay UE according to an embodiment of the disclosure.

FIG. 8AB is a diagram illustrating an example of a message for updating configuration information for communication with a relay UE according to an embodiment of the disclosure.

FIG. 8BA is a diagram illustrating an example of a message for updating configuration information for communication with a relay UE according to an embodiment of the disclosure.

FIG. 8BB is a diagram illustrating an example of a message for updating configuration information for communication with a relay UE according to an embodiment of the disclosure.

FIG. 8C is a diagram illustrating an example of a message for updating configuration information for communication with a relay UE according to an embodiment of the disclosure.

FIG. 9 is a diagram illustrating an example of a message for responding to setup or modification completion of configuration information for communication with a relay UE according to an embodiment of the disclosure.

FIG. 10 is a diagram illustrating an example of a message for transmitting an RRC message of a remote UE according to an embodiment of the disclosure.

FIG. 11 is a diagram illustrating an example of an S1/NG INITIAL UE MESSSAGE message transmitted by a base station to a core network according to an embodiment of the disclosure.

FIG. 12 is a diagram illustrating an example of an S1/NG INITIAL CONTEXT SETUP REQUEST message transmitted by a core network to a base station according to an embodiment of the disclosure.

FIG. 13AA is a diagram illustrating an example of a message for sidelink radio bearer (SL RB) setup/modification between a remote UE and a relay UE according to an embodiment of the disclosure.

FIG. 13AB is a diagram illustrating an example of a message for sidelink radio bearer (SL RB) setup/modification between a remote UE and a relay UE according to an embodiment of the disclosure.

FIG. 13B is a diagram illustrating an example of a message for sidelink radio bearer (SL RB) setup/modification between a remote UE and a relay UE according to an embodiment of the disclosure.

FIG. 14 is a diagram illustrating an example of a message for responding to completion of setup or modification for a remote UE according to an embodiment of the disclosure.

FIG. 15 is a diagram illustrating an example of a message for configuring relay radio bearer (RB) mapping according to an embodiment of the disclosure.

FIG. 21 is a diagram illustrating an example of an F1 or W1 message for transmitting an RRC message of a remote UE according to an embodiment of the disclosure.

FIG. 22 is a diagram illustrating an example of an F1 or W1 message for transmitting an RRC message of a remote UE according to an embodiment of the disclosure.

MODE FOR THE INVENTION

In the following description, in describing the disclosure, in the case that it is determined that a detailed description of a related well-known function or constitution may unnecessarily obscure the gist of the disclosure, a detailed description thereof will be omitted. Hereinafter, embodiments of the disclosure will be described with reference to the attached drawings.

Figure 1:
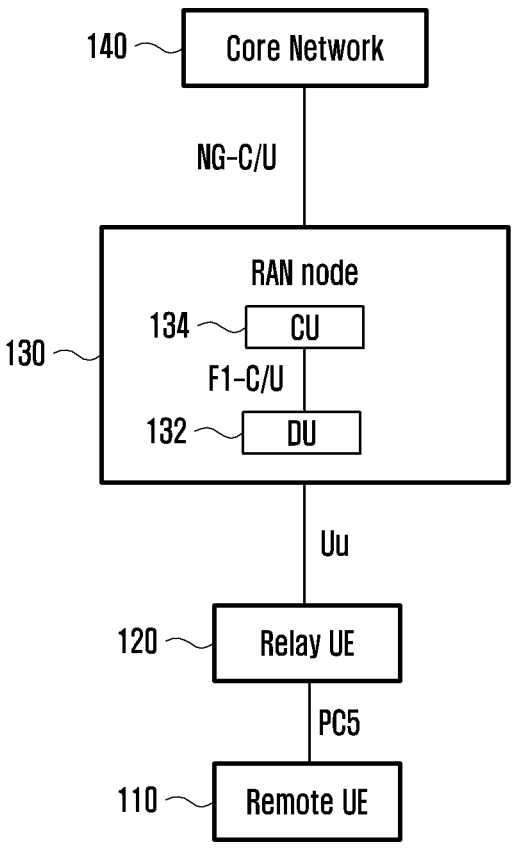
FIG. 1 is a block diagram illustrating an example of a next generation mobile communication system structure related to an embodiment of the disclosure.

FIG. 1 is a block diagram illustrating an example of a structure of a next generation mobile communication system to which the technology of the disclosure may be applied. A radio access network (RAN) node 130 specified in this structure may be a mobile communication base station connected to a core network (CN) 140 such as a 5G core network (5GC). For example, the RAN node 130 may be an LTE eNB or NR gNB.

A remote user equipment (UE) 110 is connected to a relay support user terminal (relay UE) 120 through a direct communication radio interface (e.g., PC5 interface) between UEs, and the relay UE 120 is connected to the base station (RAN node) 130 through a radio interface (e.g., Uu interface). The remote UE 110 may perform communication connection with the base station 130 through the relay UE 120 to transmit and receive control plane signaling (e.g., RRC signaling) and user plane data (e.g., Internet protocol packets).

For example, the base station 130 may be connected to the core network 140 through an interface such as next generation (NG), and be connected to another base station (not illustrated) through an interface such as Xn. The base station 130 may include a central unit (CU) 134 and a distributed unit (DU) 132. In an embodiment, the base station 130 may be composed of one CU 134 and one or more DUs 132 connected thereto or may be composed of other combinations. The CU 134 and the DU 132 may support separately each base station function. As an example, the CU 134 may support a radio resource control (RRC) layer and a packet data convergence protocol (PDCP) layer, and the DU 132 may support a radio link control (RLC) layer, a medium access control (MAC) layer, and a physical (PHY) layer. An interface between base station internal functions, such as an F1 or W1 interface, may be connected between the CU 134 and the DU 132. In an embodiment, each DU may be divided into a part that supports RLC/MAC/High-PHY and a part that supports low-PHY/RF layers.

In embodiments to be described later, in a method in which the remote UE 110 receives a mobile communication network service by performing communication connection with the base station 130 using the relay UE 120, a control information transmission method and processing method between the CU 134 and the DU 132 for enabling transmission of control plane signaling and user plane data between the remote UE 110 and the base station are provided, and necessary information of the base station 130 and the core network 140 for supporting the remote UE is provided.

In a control information transmission method and processing method between the CU 134 and the DU 132 for enabling transmission of control plane signaling and user plane data between the remote UE 110 and the base station, a method of using UE-association signaling configured between the CU 134 and the DU 132 for the relay UE 120 and a method of separately using UE-association signaling between the CU 134 and the DU 132 for the remote UE 110 may be supported.

In the case of using UE-association signaling configured between the CU 134 and the DU 132 for the relay UE 120, the number of UE-association configurations that should be managed between the CU and the DU may be reduced, and configurations for the relay UE and the remote UE may be performed simultaneously using a single control message between the CU and the DU. However, a method of separately using UE-association signaling between the CU 134 and the DU 132 for the remote UE 110 may process separately configurations for the relay UE and the remote UE in the CU and the DU and perform efficient control message processing between the CU and the DU when the remote UE performs handover. As in an F1/W1 interface, UE-association is configured to distinguish an applicable UE when transmitting control information between the CU 134 and DU 132, and UE-association differently configures and transmits, and distinguishes an UE AP ID for each UE between the CU and the DU, for example, a gNB-CU UE F1AP ID and a gNB-DU UE F1AP ID in an F1 interface.

Figure 2A:
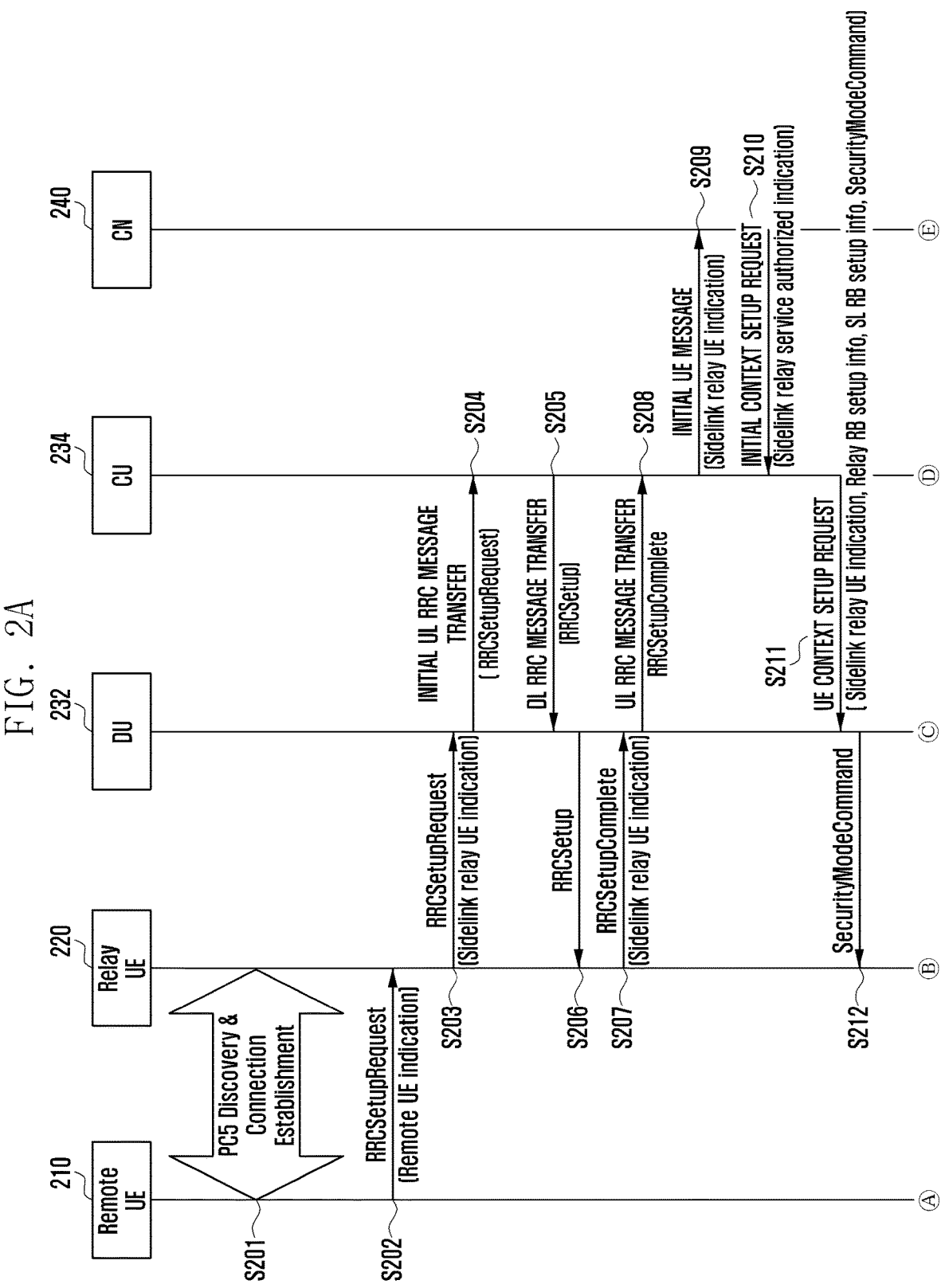
FIG. 2A is a signal flow diagram illustrating a procedure of using UE-association signaling between a CU and a DU for a relay UE according to an embodiment of the disclosure.
Figure 2B:
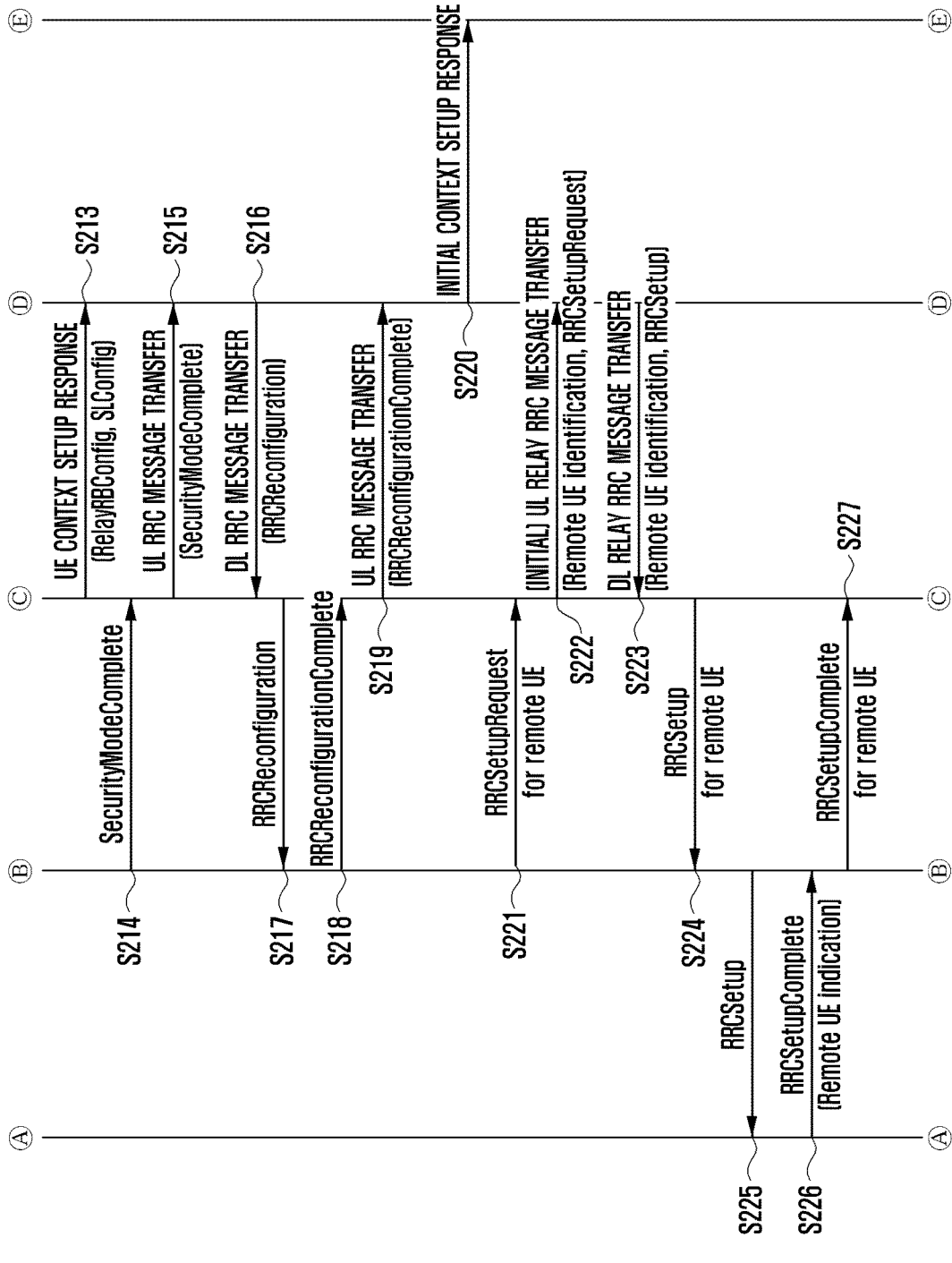
FIG. 2B is a signal flow diagram illustrating a procedure of using UE-association signaling between a CU and a DU for a relay UE according to an embodiment of the disclosure.
Figure 2C:
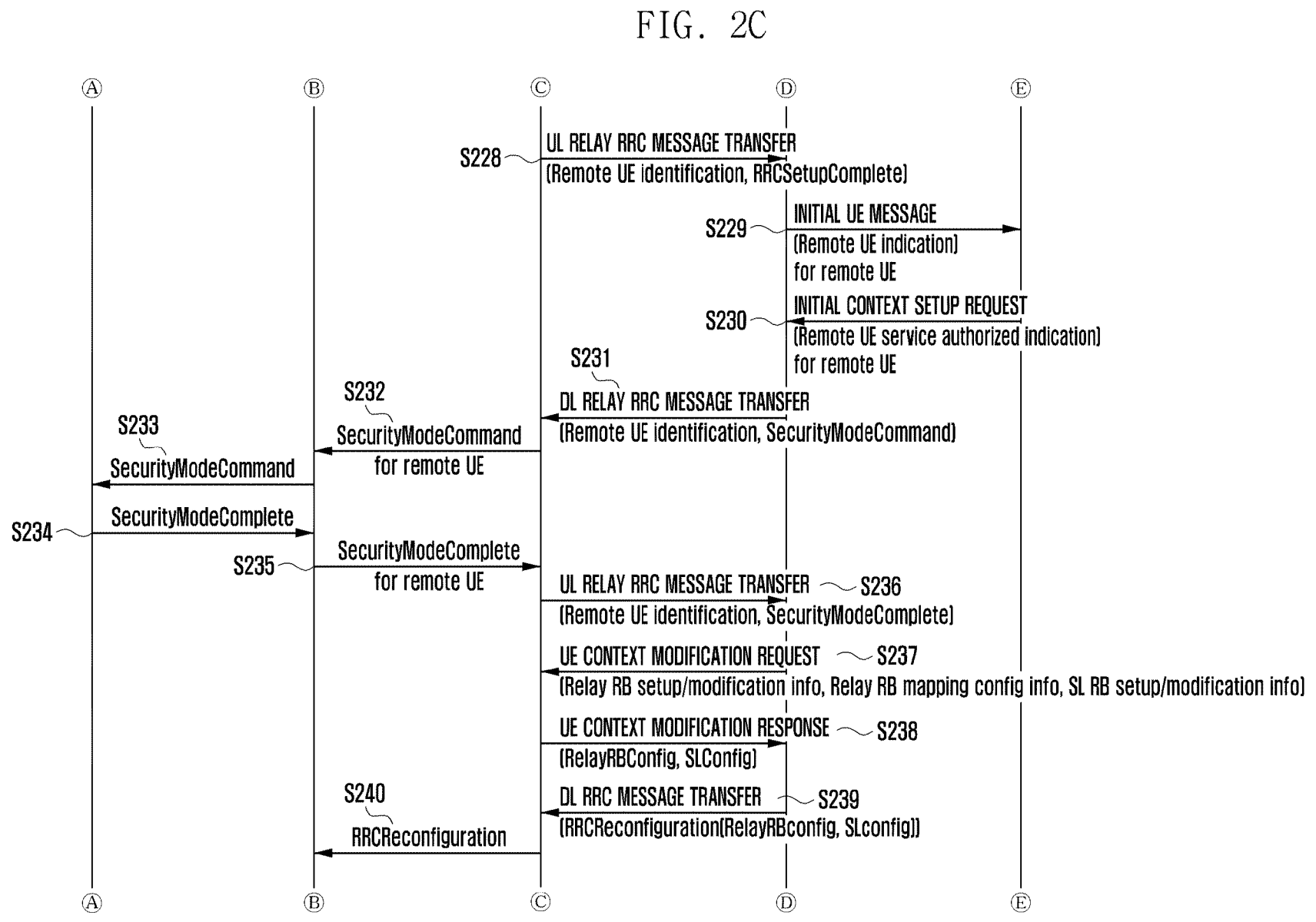
Figure 2D:
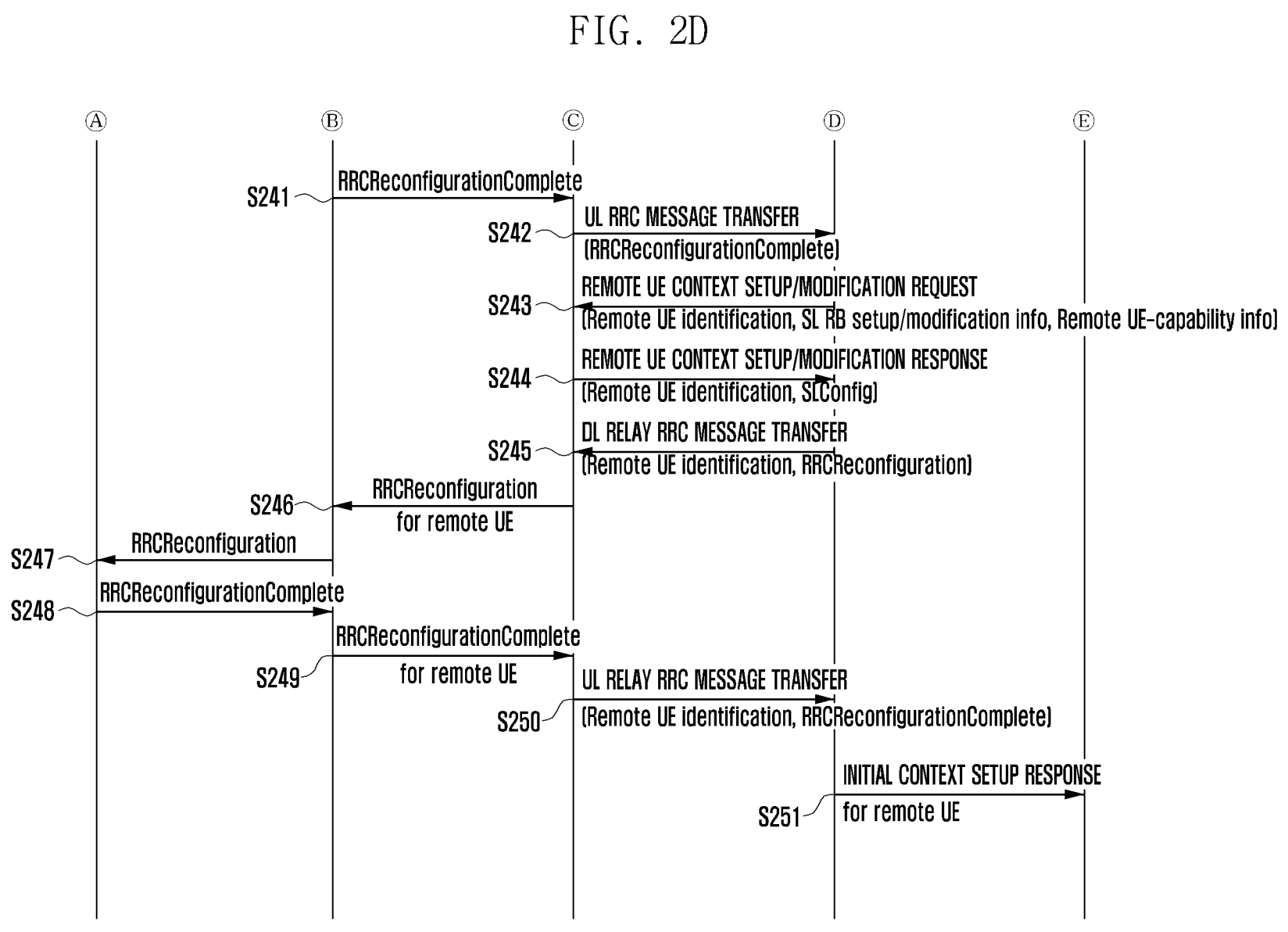

FIG. 2 is a signal flow diagram illustrating a procedure of using UE-association signaling configured between a CU and a DU for a relay UE in a control information transmission method and processing method between the CU and the DU for enabling to transmit control plane signaling and user plane data between a remote UE and a base station according to an embodiment.

With reference to FIG. 2, in step S201, a remote UE 210 performs a discovery procedure for a PC5 link connection and a PC5 connection establishment procedure for direct communication with a relay UE 220. In step S201, the remote UE 210 may include a configuration for communicating with a base station of a mobile communication network through the relay UE 220.

In step S202, the remote UE 210 transmits an RRC connection request message (e.g., RRCSetupRequest message) to be transmitted to the base station to the relay UE 220 using a PC5 link. The RRC connection request message transmitted in step S202 may include an indicator (e.g., remote UE indication) indicating the remote UE.

In the case that the relay UE 220 is in an RRC IDLE mode, in step S203, the relay UE 220 transmits an RRC connection request message (e.g., RRCSetupRequest message) to the base station. The RRC connection request message transmitted in step S203 may include an indicator (e.g., sidelink relay UE indication) that supports a relay function of the remote UE 210 or that will perform relay. When a DU 232 of the base station receives an RRC message transmitted by the relay UE 220, in step S204, the DU 232 of the base station transmits the RRC message transmitted by the relay UE 220 to a CU 234 of the base station using an F1 or W1 message (e.g., INITIAL UL RRC MESSAGE TRANSFER message).

In step S205, the CU 234 of the base station generates an RRC connection setup message (e.g., RRCSetup message to transmit to the relay UE 220 in order to establish the connection of the relay UE 220 and then transmits the RRC connection setup message to the DU 232 of the base station using an F1 or W1 message (e.g., DL RRC MESSAGE TRANSFER message). In step S206, the DU 232 of the base station transmits an RRC connection setup message to the relay UE 220. The relay UE 220 that has received the RRC connection setup message from the base station transmits an RRC connection setup complete message (e.g., RRCSetupComplete message) to the base station in step S207. The RRC connection request message transmitted in step S207 may include an indicator (e.g., sidelink relay UE indication) that supports a relay function of the remote UE 210 or that will perform relay. The DU 232 of the base station that has received the transmitted RRC connection setup complete message by the relay UE 220 transmits the RRC message transmitted by the relay UE 220 to the CU 234 of the base station using the F1 or W1 message (e.g., UL RRC MESSAGE TRANSFER message).

In step S209, the CU 234 that has received the RRC connection setup complete message transmitted by the UE from the DU 232 transmits the INITIAL UE MESSSAGE message to the core network 240 in order to configure a context of the relay UE 220, and for example, in the core network 240, an access and mobility management function (AMF) or a mobility management entity (MME) receives the INITIAL UE MESSSAEG message transmitted by the base station. The INITIAL UE MESSSAGE message transmitted in step S209 includes an indicator (e.g., sidelink relay UE indication) that the corresponding UE supports a relay function or that will perform relay. The core network 240 identifies whether the corresponding UE is a UE permitted to perform a relay function, and in the case that the corresponding UE is a permitted UE, in step S210, the core network 240 transmits an INITIAL CONTEXT SETUP REQUEST message to the base station in order to configure the context of the UE. The INITIAL CONTEXT SETUP REQUEST message transmitted in step S210 includes an indicator (e.g., sidelink relay service authorized indication) that the corresponding UE is a UE permitted to use the relay function.

When the CU 234 of the base station receives the INITIAL CONTEXT SETUP REQUEST message from the core network 240, in step S211, the CU 234 transmits an F1 or W1 message (e.g., UE CONTEXT SETUP REQUEST message) including configuration information for communication with the relay UE 220 to the DU 232. The F1 or W1 message (e.g., UE CONTEXT SETUP REQUEST message) transmitted in step S211 may include an indicator (e.g., sidelink relay UE indication) that the corresponding UE will perform a relay function, RB setup information (e.g., relay radio bearer setup info) for transmission of CP signaling (RRC message) exchanged between the base station and the remote UE 210 and/or sidelink radio bearer (SL RB) constitution information (e.g., sidelink radio bearer setup info) for direct communication between the relay UE 220 and the remote UE 210. Further, the F1 or W1 message may include an RRC SecurityModeCommand message for a security configuration of the base station and the relay UE 220.

In step S211, the DU 232 that has received context configuration request information for the relay UE 220 from the CU 234 completes a configuration for the relay UE 220, then transmits an RRC SecurityModeCommand message to the relay UE 220 in step S212, and transmits an F1 or W1 message (e.g., UE CONTEXT SETUP RESPONSE message) responding to completion of a configuration for the corresponding UE to the CU 234 in step S213. The F1 or W1 message (e.g., UE CONTEXT SETUP RESPONSE message) transmitted in step S213 includes radio bearer (RB) configuration information (e.g., RelayRBConfig Information Element (IE)) of the relay UE 220 for transmission of CP signaling (RRC message) exchanged between the base station and the remote UE 210 to be transmitted to the relay UE 220 and/or sidelink radio bearer (SL RB) configuration information (e.g., SidelinkConfig IE) for direct communication between the relay UE 220 and the remote UE 210.

In step S214, the relay UE 220 that has received the RRC SecurityModeCommand message from the base station in step S212 transmits the RRC SecurityModeComplete message to the base station. When the DU 232 receives an RRC message from the relay UE 220 in step S214, in step S215, the DU 232 transmits the RRC message to the CU 234 using the F1 or W1 message (e.g., UL RRC MESSAGE TRANSFER message).

The CU 234 that has received a response message (e.g., UE CONTEXT SETUP RESPONSE message) to the context configuration request from the DU 232 in step S213 generates an RRC connection reconfiguration message (e.g., RRCReconfiguration message) including configuration information of the relay UE 220 included in the response message to the context configuration request and then transmits the RRC message to the DU 232 using the F1 or W1 message (e.g., DL RRC MESSAGE TRANSFER message)

in step S216. In step S217, the DU 232 transmits the RRC message received from the CU 234 to the relay UE 220.

In step S218, the UE that has received the RRC connection reconfiguration message (e.g., RRCReconfiguration message) from the base station performs an internal configuration based on information included in the message and then transmits an RRC connection reconfiguration complete message (e.g., RRCReconfigurationComplete message) to the base station. In step S219, the DU 232 that has received the RRC message from the relay UE 220 transmits the RRC message to the CU 234 using the F1 or W1 message (e.g., UL RRC MESSAGE TRANSFER message). In step S220, the CU 234 identifies the RRC connection reconfiguration complete message (e.g., RRCReconfigurationComplete message) and then transmits an INITIAL CONTEXT SETUP RESPONSE message to the core network 240.

When the relay UE 220 completes RRC connection establishment with the base station in step S218, the relay UE 220 transmits an RRC connection request message (e.g., RRCSetupRequest message) of the remote UE 210 received from the remote UE 210 in step S202 to the base station using the configured relay RB. In step S221, when the DU 232 receives the RRC message of the remote UE 210 through the configured relay RB, the DU 232 identifies information on the remote UE. Information of the remote UE may be identified using received relay RB information or header information (e.g., a header of an adaptation layer) included when transmitting the RRC message.

In step S221, after the DU 232 receives the RRC message of the remote UE 210, in the case that the remote UE is not identified, that is, in the case that the RRC message is a first RRC message (e.g., RRCSetupRequest message) transmitted by the remote UE 210, in step S222, the DU 232 transmits the RRC message of the remote UE 210 to the CU 234 using the F1 or W1 message (e.g., INITIAL UL RELAY RRC MESSAGE TRANSFER message or UL RELAY RRC MESSAGE TRANSFER message). The F1 or W1 message (e.g., INITIAL UL RELAY RRC MESSAGE TRANSFER message, UL RELAY RRC MESSAGE TRANSFER message) transmitted in step S222 may include remote UE identifier (e.g., remote UE identification) information in which the DU 232 uses for distinguishing the corresponding remote UE 210. The remote UE identifier (e.g., remote UE identification) for using for distinguishing the remote UE 210 may be generated in the following format, and other types of identifiers for distinguishing the UE may be used.

Randomly generated UE identifier (UE identification value)

I-RNTI (Inactive Radio Network Temporary Identity)

Base station identifier (RAN node identification value) & randomly generated UE identifier (UE identification value)

Cell identifier (Cell identification value) & randomly generated UE identifier (UE identification value)

S-TMSI (SAE Temporary Mobile Subscriber Identity or 5G-S-TMSI)

IMSI (International Mobile Subscriber Identity) or SUPI (5G globally unique Subscription Permanent Identifier)

The F1 or W1 message (e.g., INITIAL UL RELAY RRC MESSAGE TRANSFER message, UL RELAY RRC MESSAGE TRANSFER message) transmitted in step S222 is a UE-associated signaling message in an F1 or W1 interface and is used as a UE-associated signaling message configured for the relay UE. That is, a UE identifier (e.g., gNB-CU UE F1AP ID and gNB-CU UE F1AP ID) in the F1 or W1 message included in the F1 or W1 message (e.g., INITIAL UL RELAY RRC MESSAGE TRANSFER message, UL RELAY RRC MESSAGE TRANSFER message) transmitted in step S222 and a UE identifier configured to distinguish the relay UE are used as they are.

In step S222, the CU 234 that has received the RRC connection request message (e.g., RRCSetupRequest message) transmitted by the remote UE 210 generates the RRC connection setup message (e.g., RRCSetup message) transmitted to the remote UE 210 and then transmits the RRC connection setup message to the DU 232 using the F1 or W1 message (e.g., DL RELAY RRC MESSAGE TRANSFER message) in step S223. The F1 or W1 message transmitted in step S223 is a UE-associated signaling message configured for the relay UE, and the F1 or W1 message transmitted in step S223 may include an identifier (e.g., remote UE identification) for distinguishing the remote UE.

In step S223, the DU 232 that has received the RRC message to be transmitted from the CU 234 to the remote UE 210 includes identification information for distinguishing the remote UE in header information (e.g., a header of an adaptation layer) constituted to transmit the RRC message according to an identifier (e.g., remote UE identification) for distinguishing the remote UE and/or transmits the information to the relay UE 220 using relay RB in step S224. In step S225, the relay UE 220 that has received the RRC message to be transmitted from the base station to the remote UE identifies the remote UE and then transmits a remote UE RRC message to the remote UE 210 using the PC5 link.

In step S226, the remote UE 210 that has received the RRC connection setup message (e.g., RRCSetup message) transmitted by the base station 130 through the relay UE 220 transmits an RRC connection setup complete message (e.g., RRCSetupComplete message) to the relay UE 120 using the PC5 link. The RRC connection setup complete message (e.g., RRCSetupComplete message) transmitted in step S226 may include an indicator (e.g., remote UE indication) indicating the remote UE. In step S227, the relay UE 220 that has received an RRC connection setup complete message (e.g., RRCSetupComplete message) from the remote UE 210 transmits an RRC connection setup complete message (e.g., RRCSetupComplete message) of the remote UE 110 to the base station using the configured RB relay. In step S227, when the DU 232 receives the RRC message of the remote UE 210 through the configured relay RB, the DU 232 identifies information on the remote UE 210. Information of the remote UE may be identified using received relay RB information or header information (e.g., a header of an adaptation layer) included when transmitting the RRC message.

In step S228, the DU 232 transmits the RRC message of the remote UE 210 to the CU 234 using the F1 or W1 message (e.g., UL RELAY RRC MESSAGE TRANSFER message). The F1 or W1 message transmitted in step S228 is a UE-associated signaling message configured for the relay UE, and the F1 or W1 message transmitted in step S228 may include an identifier (e.g., remote UE identification) for distinguishing the remote UE.

In step S229, the CU 234 that has received the RRC connection setup complete message transmitted by the remote UE 220 from the DU 232 transmits an INITIAL UE MESSSAGE message to the core network 240 for a context configuration of the remote UE 220 and for example, in the core network 240, an access and mobility management function (AMF) or a mobility management entity (MME) receive an INITIAL UE MESSSAGE transmitted by the base station. The INITIAL UE MESSSAGE message transmitted in step S229 may include an indicator (e.g., remote UE indication) that the corresponding UE will operate as the remote UE. The core network 240 identifies whether the corresponding UE is a UE permitted to operate as the remote UE, and in the case that the corresponding UE is a permitted UE, in step S230, the core network 240 transmits the INITIAL CONTEXT SETUP REQUEST message to the base station 230 for a context configuration of the corresponding UE. The INITIAL CONTEXT SETUP REQUEST message transmitted in step S230 includes an indicator (e.g., remote UE service authorized indication) that the corresponding UE is a UE permitted to operate as the remote UE.

When the CU 234 of the base station receives the INITIAL CONTEXT SETUP REQUEST message from the core network 240, in step S231, the CU 234 generates an RRC SecurityModeCommand message for security configuration with the remote UE 210 and then includes the RRC SecurityModeCommand message to be transmitted to the remote UE 210 in an F1 or W1 message (e.g., DL RELAY RRC MESSAGE TRANSFER message) 210 for transmission to the remote UE 210 and transmits the message to DU 232. The F1 or W1 message transmitted in step S231 is a UE-associated signaling message configured for the relay UE, and the F1 or W1 message transmitted in step S231 may include an identifier (e.g., remote UE identification) for distinguishing the remote UE.

In step S231, the DU 232 that has received the RRC message to be transmitted from the CU 234 to the remote UE 210 includes identification information for distinguishing the remote UE in header information (e.g., header of the adaptation layer) constituted to transmit the RRC message according to an identifier (e.g., remote UE identification) for distinguishing the remote UE and/or transmits the information to the relay UE 220 using relay RB in step S232. In step S233, the relay UE 220 that has received the RRC message to be transmitted from the base station to the remote UE identifies the remote UE and then transmits a remote UE RRC message to the remote UE 210 using a PC5 link.

In step S233, the remote UE 210 that has received the RRC SecurityModeCommand message transmitted by the base station from the relay UE 220 generates an RRC SecurityModeComplete message and then transmits the RRC SecurityModeComplete message to the relay UE 220 using the PC5 link in step S234. In step S235, the relay UE 220 that has received the RRC SecurityModeComplete message from the remote UE 210 transmits the RRC SecurityModeComplete message of the remote UE 210 to the base station 230 using the configured relay RB. In step S235, when the DU 232 receives the RRC message of the remote UE 210 through the configured relay RB, the DU 232 identifies information on the remote UE 210. Information of the remote UE may be identified using received relay RB information or header information (e.g., a header of an adaptation layer) included when transmitting the RRC message. In step S236, the DU 232 transmits the RRC message of the remote UE 210 to the CU 234 using the F1 or W1 message (e.g., UL RELAY RRC MESSAGE TRANSFER message). The F1 or W1 message transmitted in step S236 is a UE-associated signaling message configured for the relay UE, and the F1 or W1 message transmitted in step S236 may include an identifier (e.g., remote UE identification) for distinguishing the remote UE.

After the CU 234 of the base station receives the INITIAL CONTEXT SETUP REQUEST message in step S230 from the core network 240 or after receiving the RRC SecurityModeComplete message transmitted by the remote UE 210 in step S232, in step S237, the CU 234 transmits an F1 or W1 message (e.g., UE CONTEXT MODIFICATION REQUEST message) to the DU 232 in order to update configuration information for communication with the relay UE 220.

The F1 or W1 message (e.g., UE CONTEXT MODIFICATION REQUEST message) transmitted in step S237 may include RB setup/modification information (e.g., relay radio bearer setup/modification info) for transmission of user plane data and CP signaling (RRC message) exchanged between the base station and the remote UE 210, relay RB mapping information (e.g., relay RB mapping config info) for transmission of user plane data of the remote UE and/or sidelink radio bearer (SL RB) setup/modification information (e.g., sidelink radio bearer setup/update) for direct communication between the relay UE 220 and the remote UE 110. Relay RB mapping information (e.g., relay RB mapping config info) for transmission of user plane data of the remote UE may include data radio bearer (DRB) associated with a UE user plane GPRS tunneling protocol (GTP) tunnel (e.g., F1-U or W1-U GTP tunnel for each radio bearer) used between the CU 234 and the DU 232 for a user data transmission service of the remote UE and mapping information of RB for transmission of user plane data of the base station and the remote UE 210.

In step S237, the DU 232 that has received context change request information for the relay UE 220 from the CU 234 completes a configuration for the relay UE 220 and then transmits an F1 or W1 message (e.g., UE CONTEXT MODIFICATION RESPONSE message) responding to completion of a configuration for the corresponding UE to the CU 234 in step S238. The F1 or W1 message (e.g., UE CONTEXT MODIFICATION RESPONSE message) transmitted in step S238 includes RB setup/modification information (e.g., RelayRBConfig IE) of the relay UE 220 for transmission of user plane data and CP signaling (RRC message) exchanged between the base station and the remote UE 210 to be transmitted to the relay UE 220 and/or sidelink radio bearer (SL RB) setup/modification information (e.g., SidelinkConfig IE) for direct communication between the relay UE 220 and the remote UE 210.

In step S238, the CU 234 that has received a response message (e.g., UE CONTEXT SETUP RESPONSE message) to the context change request from the DU 232 generates an RRC connection reconfiguration message (e.g., RRCReconfiguration message) including constitution information of the relay UE 120 included in a response message to the context configuration request and then transmits the RRC message to the DU 232 using an F1 or W1 message (e.g., DL RRC MESSAGE TRANSFER message) in step S239.

In step S240, the DU 232 transmits the RRC message received from the CU 234 in step S239 to the relay UE 220. In step S241, the relay UE 220 that has received an RRC connection reconfiguration message (e.g., RRCReconfiguration message) from the base station performs an internal configuration based on information included in the message and then transmits an RRC connection reconfiguration complete message (e.g., RRCReconfigurationComplete message) to the base station 230. In step S242, the DU 232 that has received the RRC message from the relay UE 220 transmits the RRC message to the CU 234 using the F1 or W1 message (e.g., UL RRC MESSAGE TRANSFER message).

For a sidelink radio bearer (SL RB) configuration for direct communication between the remote UE 210 and the relay UE 220 for the remote UE 210, in step S243, the CU 234 transmits an F1 or W1 message (e.g., REMOTE UE CONTEXT SETUP/MODIFICATION REQUEST message)

including sidelink radio bearer (SL RB) setup/modification information (e.g., sidelink radio bearer setup/modification info) for direct communication between the remote UE 110 and the relay UE 220 to the DU 232. The F1 or W1 message (e.g., REMOTE UE CONTEXT SETUP/MODIFICATION REQUEST message) transmitted in step S243 is a UE-associated signaling message configured for the relay UE, and the F1 or W1 message transmitted in step S243 may include an identifier (e.g., remote UE identification) for distinguishing the remote UE and radio capability information (e.g., remote UE-capability info) of the remote UE 210.

In step S243, the DU 232 that has received context setup/modification request information for the remote UE 210 from the CU 234 completes a configuration for the remote UE 210 and then transmits an F1 or W1 message (e.g., REMOTE UE CONTEXT SETUP/MODIFICATION RESPONSE message) responding to completion of the configuration for the corresponding UE to the CU 234 in step S244. The F1 or W1 message transmitted in step S244 is a UE-associated signaling message configured for the relay UE and may include sidelink radio bearer (SL RB) setup/modification information (e.g., SidelinkConfig IE) for direct communication between the remote UE 210 and the relay UE 220, and an identifier (e.g., remote UE identification) for distinguishing the remote UE.

In step S244, the CU 234 that has received a response message (e.g., REMOTE UE CONTEXT SETUP/MODIFICATION RESPONSE message) to a context change request for the remote UE 210 from the DU 232 generates an RRC connection reconfiguration message (e.g., RRCReconfiguration message) including configuration information of the remote UE 210 included in the response message to the context configuration request and then transmits an RRC message to the DU 232 using an F1 or W1 message (e.g., DL RELAY RRC MESSAGE TRANSFER message) in step S245. The F1 or W1 message transmitted in step S245 is a UE-associated signaling message configured for the relay UE, and may include an identifier (e.g., remote UE identification) for distinguishing the remote UE.

In step S245, the DU 232 that has received the RRC message to be transmitted from the CU 234 to the remote UE 210 includes identification information for distinguishing the remote UE in header information (e.g., a header of an adaptation layer) constituted to transmit the RRC message according to an identifier (e.g., remote UE identification) for distinguishing the remote UE and/or transmits the information to the relay UE 220 using relay RB in step S246. In step S247, the relay UE 220 that has received the RRC message to be transmitted from the base station 130 to the remote UE identifies the remote UE and then transmits the remote UE RRC message to the remote UE 210 using the PC5 link.

In step S248, the remote UE 210 that has received an RRC connection reconfiguration message (e.g., RRCReconfiguration message) from the base station performs an internal configuration based on information included in the message, and then transmits an RRC connection reconfiguration complete message (e.g., RRCReconfigurationComplete message) to the relay UE 220 using the PC5 link. In step S249, the relay UE 220 that has received the RRC connection reconfiguration complete message (e.g., RRCReconfigurationComplete message) from the remote UE 210 transmits the RRC connection reconfiguration complete message to the base station using the configured relay RB. In step S249, when the DU 232 receives the RRC message of the remote UE 210 through the configured relay RB, the DU 232 identifies information on the remote UE 210. Information of the remote UE may be identified using received relay RB information or header information (e.g., a header of an adaptation layer) included when transmitting the RRC message. In step S250, the DU 232 transmits the RRC message of the remote UE 210 to the CU 234 using the F1 or W1 message (e.g., UL RELAY RRC MESSAGE TRANSFER message). The F1 or W1 message transmitted in step S250 is a UE-associated signaling message configured for the relay UE, and the F1 or W1 message transmitted in step S250 may include an identifier (e.g., remote UE identification) for distinguishing the remote UE.

In step S251, the CU 234 identifies the RRC connection reconfiguration complete message (e.g., RRCReconfigurationComplete message) transmitted by the remote UE 210 and then transmits an INITIAL CONTEXT SETUP RESPONSE message to the core network 240.

Figure 3:
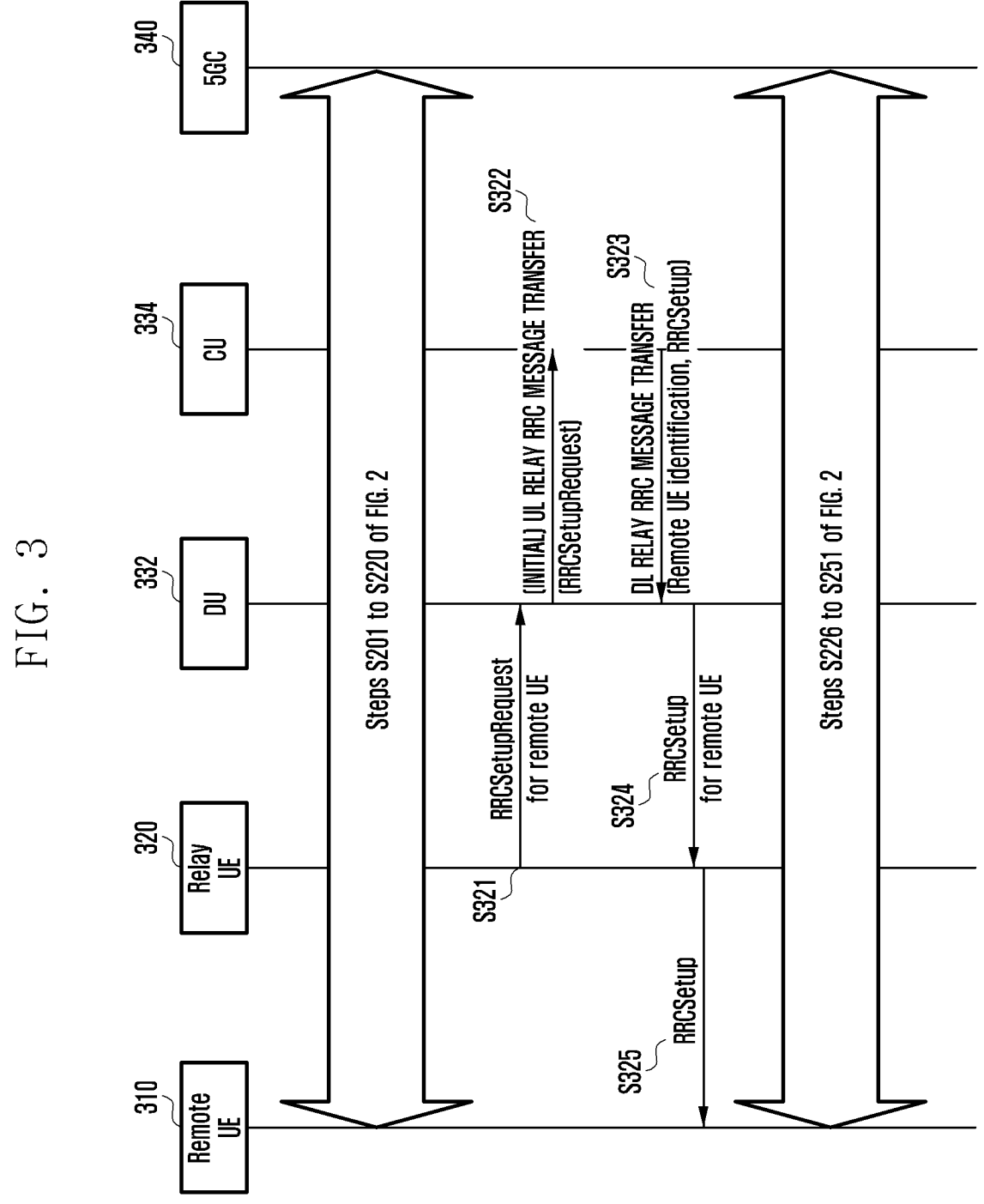
FIG. 3 is a signal flow diagram illustrating a procedure in which a CU generates and uses information for distinguishing a remote UE according to an embodiment of the disclosure.

FIG. 3 is a signal flow diagram illustrating a procedure of the case that a CU generates and uses remote UE identifier (e.g., remote UE identification) information for using to distinguish the remote UE in relay UE-association signaling between the CU and a DU in a procedure of using UE-association signaling configured between the CU and the DU for the relay UE in a control information transmission method and processing method between a CU and a DU for enabling to transmit control plane signaling and user plane data between the remote UE and the base station according to an embodiment of FIG. 2.

With reference to FIG. 3, because the procedure of FIG. 3 is performed on the premise of the procedure of steps S201 to S220 of FIG. 2, a redundant description will be omitted.

In step S321 of FIG. 3, a relay UE 320 transmits an RRC connection request message (e.g., RRCSetupRequest message) of a remote UE 310 received from the remote UE 310 to the base station using the configured relay RB. In step S321, when a DU 332 receives the RRC message of the remote UE 310 through the configured relay RB, the DU 332 identifies information on the remote UE. Information of the remote UE may be identified using received relay RB information or header information (e.g., a header of an adaptation layer) included when transmitting the RRC message. After the DU 332 receives the RRC message of the remote UE 310 in step S321, in the case that the remote UE is not identified, that is, in the case that the RRC message is a first RRC message (e.g., RRCSetupRequest message) transmitted by the remote UE 310, in step S322, the DU 332 transmits the RRC message of the remote UE 110 to a CU 334 using the F1 or W1 message (e.g., INITIAL UL RELAY RRC MESSAGE TRANSFER message or UL RELAY RRC MESSAGE TRANSFER message).

The F1 or W1 message (e.g., INITIAL UL RELAY RRC MESSAGE TRANSFER message, UL RELAY RRC MESSAGE TRANSFER message) transmitted in step S322 is a UE-associated signaling message in an F1 or W1 interface and is used as a UE-associated signaling message configured for the relay UE. That is, a UE identifier (e.g., gNB-CU UE F1AP ID and gNB-DU UE F1AP ID) in the F1 or W1 message included in the F1 or W1 message (e.g., INITIAL UL RELAY RRC MESSAGE TRANSFER message, UL RELAY RRC MESSAGE TRANSFER message) transmitted in step S322 and a UE identifier configured to distinguish the relay UE are used as they are.

In step S322, the CU 334 that has received the RRC connection request message (e.g., RRCSetupRequest message) transmitted by the remote UE 310 generates an RRC connection setup message (e.g., RRCSetup message) transmitted to the remote UE 310 and then transmits the RRC connection setup message to the DU 332 using the F1 or W1 message (e.g., DL RELAY RRC MESSAGE TRANSFER message) in step S323. The F1 or W1 message transmitted in step S323 is a UE-associated signaling message configured for the relay UE, and the CU 334 generates an identifier (e.g., remote UE identification) for distinguishing the remote UE, and the F1 or W1 message transmitted in step S323 may include the identifier.

In step S323, the DU 332 that has received an RRC message to be transmitted from the CU 334 to the remote UE 110 stores identifier (e.g., remote UE identification) information for distinguishing the remote UE 110 and includes identification information for distinguishing the remote UE in header information (e.g., a header of an adaptation layer) constituted to transmit the RRC message according to the identifier and/or transmits the information to the relay UE 320 using relay RB in step S324. In step S325, the remote UE 320 that has received the RRC message to be transmitted from the base station to the remote UE identifies the remote UE and then transmits a remote UE RRC message to the remote UE 310 using the PC5 link.

Hereafter, a redundant description will be omitted on the premise that the procedure of steps S226 to S251 of FIG. 2 is applied.

Figure 4:
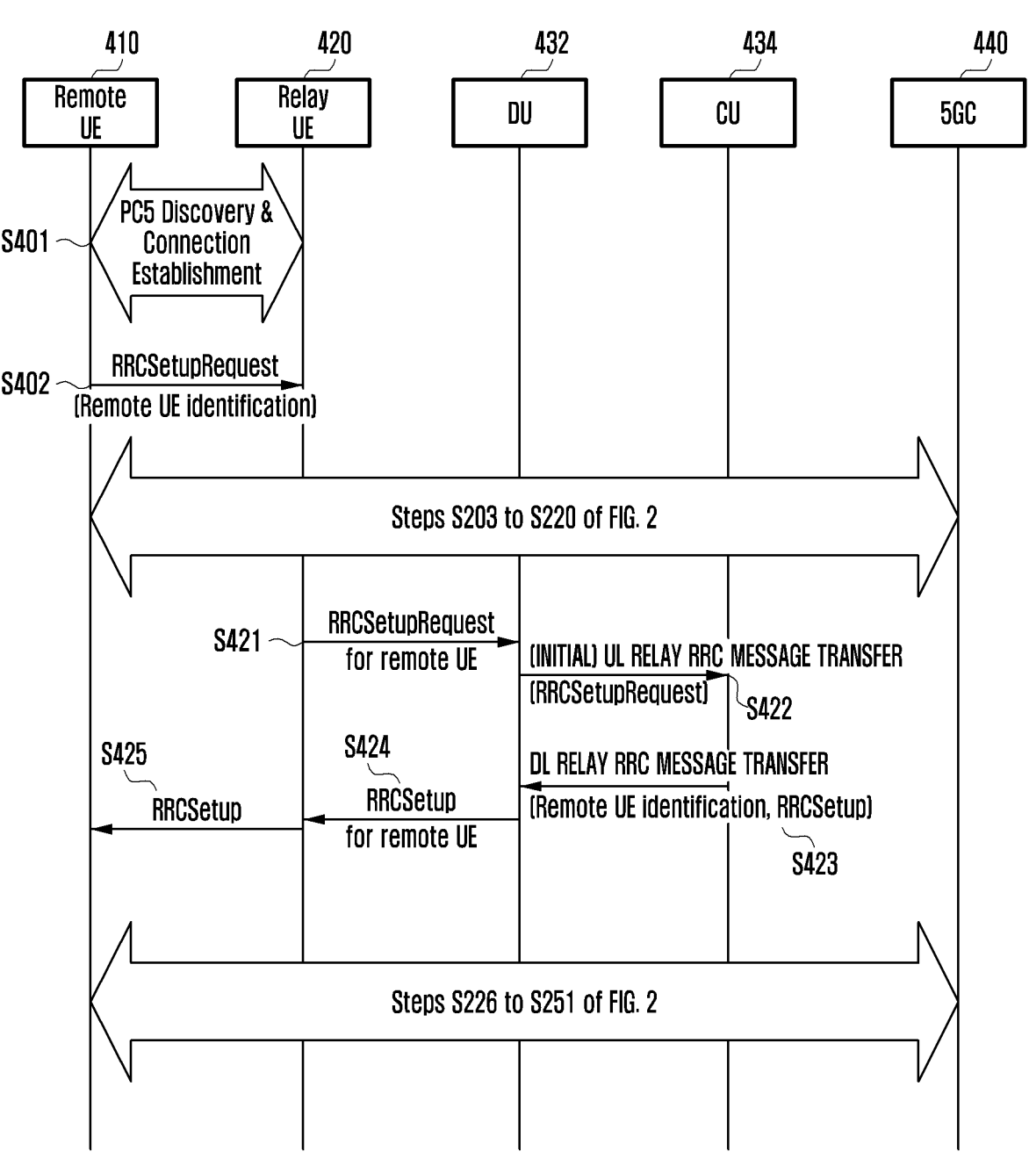
FIG. 4 is a signal flow diagram illustrating a procedure in which a remote UE generates and uses remote UE identifier information according to an embodiment of the disclosure.

FIG. 4 is a signal flow diagram illustrating a procedure of the case that a remote UE generates and uses remote UE identifier (e.g., remote UE identification) information for using to distinguish the remote UE in relay UE-association signaling between the CU and the DU in a procedure of using UE-association signaling configured between the CU and the DU for the remote UE in a control information transmission method and processing method between the CU and the DU for enabling to transmit control plane signaling and user plane data between the remote UE and a base station according to an embodiment of FIG. 2.

With reference to FIG. 4, in step S401, a remote UE 410 performs a discovery procedure for a PC5 link connection and a PC5 connection establishment procedure for direct communication with a relay UE 420. In step S401, the remote UE 410 may include a configuration for communicating with a base station of a mobile communication network through the relay UE 420.

In step S402, the remote UE 410 transmits an RRC connection request message (e.g., RRCSetupRequest message) to be transmitted to the base station to the relay UE 420 using the PC5 link. The RRC connection request message transmitted in step S402 may include an identifier (e.g., remote UE identification) for distinguishing the remote UE representing the remote UE.

Thereafter, the procedure of step S203 to step S220 of FIG. 2 is followed as it is, and in step S421 of FIG. 4, the relay UE 420 transmits an RRC connection request message (e.g., RRCSetupRequest message) of the remote UE 410 received from the remote UE 410 to the base station using the configured relay RB. In step S421, when a DU 432 receives the RRC message of the remote UE 410 through the configured relay RB, the DU 432 identifies information on the remote UE. Information of the remote UE may be identified using received relay RB information or header information (e.g., a header of an adaptation layer) included when transmitting the RRC message.

After the DU 432 receives the RRC message of the remote UE 410 in step S421, in the case that the remote UE is not identified, that is, in the case that the RRC message is a first RRC message (e.g., RRCSetupRequest message) transmitted by the remote UE 410, in step S422, the DU 432 transmits the RRC message of the remote UE 410 to a CU 434 using the F1 or W1 message (e.g., INITIAL UL RELAY RRC MESSAGE TRANSFER message or the UL RELAY RRC MESSAGE TRANSFER message). The F1 or W1 message (e.g., INITIAL UL RELAY RRC MESSAGE TRANSFER message, UL RELAY RRC MESSAGE TRANSFER message) transmitted in step S422 is a UE-associated signaling message in an F1 or W1 interface and is used as a UE-associated signaling message configured for the relay UE. That is, a UE identifier (e.g., gNB-CU UE F1AP ID and gNB-CU UE F1AP ID) in the F1 or W1 message included in the F1 or W1 message (e.g., INITIAL UL RELAY RRC MESSAGE TRANSFER message, UL RELAY RRC MESSAGE TRANSFER message) transmitted in step S422 and a UE identifier configured to distinguish the relay UE are used as they are.

In step S422, the CU 434 that has received the RRC connection request message (e.g., RRCSetupRequest message) transmitted by the remote UE 410 generates an RRC connection setup message (e.g., RRCSetup message) transmitted to the remote UE 410 and then transmits the RRC connection setup message to the DU 432 using the F1 or W1 message (e.g., DL RELAY RRC MESSAGE TRANSFER message) in step S423. The F1 or W1 message transmitted in step S423 is a UE-associated signaling message configured for the relay UE, and the F1 or W1 message transmitted in step S423 may include an identifier (e.g., remote UE identification) for distinguishing the remote UE included in the RRC connection request message (e.g., RRCSetupRequest message) transmitted by the remote UE 410.

In step S423, the DU 432 that has received the RRC message to be transmitted from the CU 434 to the remote UE 410 stores identifier (e.g., remote UE identification) information for distinguishing the remote UE and includes identification information for distinguishing the remote UE in header information (e.g., a header of an adaptation layer) constituted to transmit an RRC message according to the identifier and/or transmits the information to the relay UE 420 using relay RB in step S424. In step S425, the relay UE 120 that has received the RRC message to be transmitted from the base station to the remote UE identifies the remote UE and then transmits a remote UE RRC message to the remote UE 410 using the PC5 link.

Thereafter, the procedure of steps S226 to S251 of FIG. 2 is followed as it is.

Figure 5:
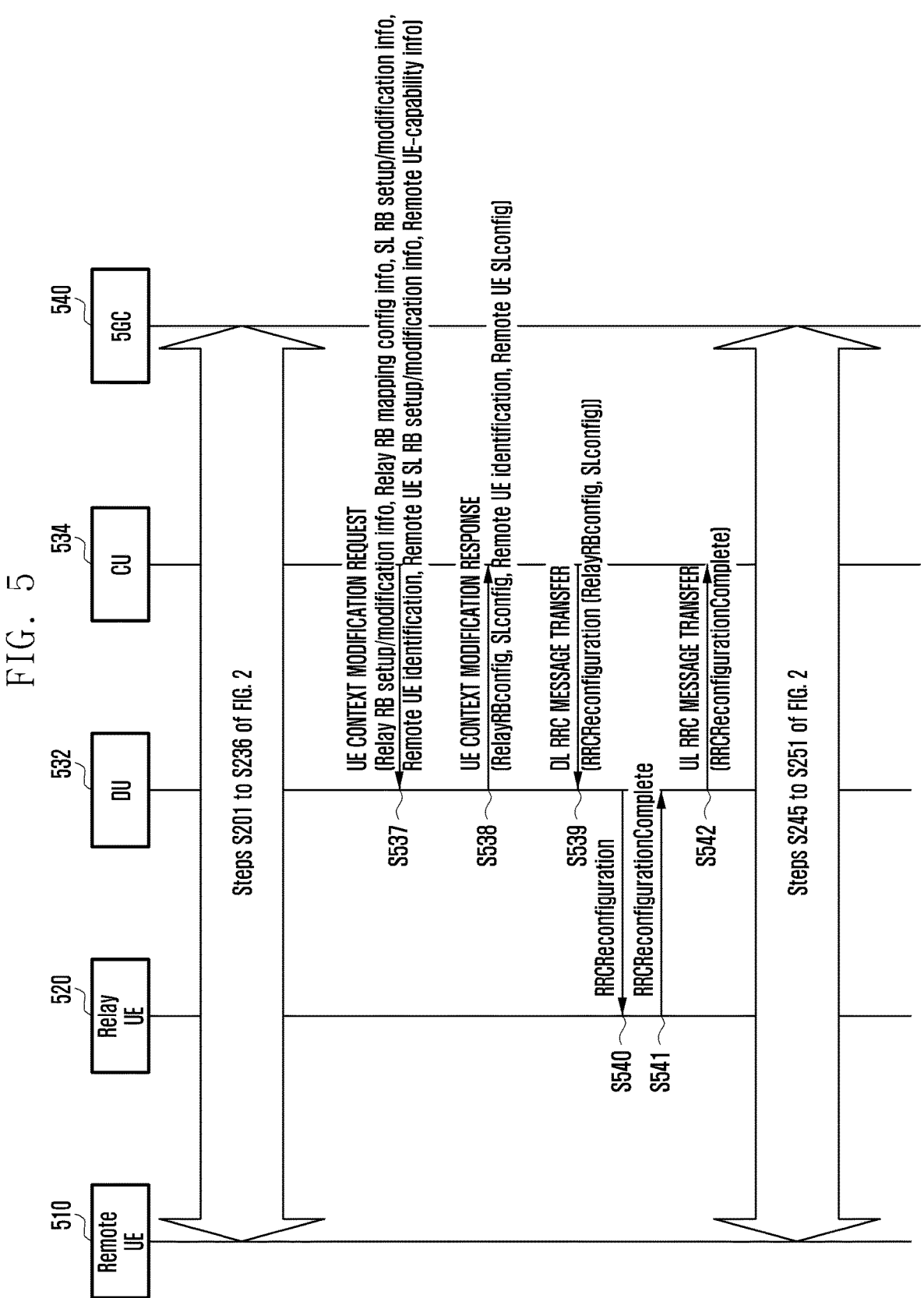
FIG. 5 is a signal flow diagram illustrating a procedure for updating configuration information for communication with a relay UE and configuration information for the relay UE and a remote UE according to an embodiment of the disclosure.

FIG. 5 is a signal flow diagram illustrating a procedure for simultaneously updating configuration information for a relay UE and a remote UE in a procedure for updating configuration information for communication with the relay UE between a CU and a DU in a procedure of using UE-association signaling configured between the CU and the DU for the relay UE in a control information transmission method and processing method between the CU and the DU for enabling to transmit control plane signaling and user plane data between the remote UE and a base station according to an embodiment of FIG. 2.

With reference to FIG. 5, because the procedure of steps S201 to S236 of FIG. 2 is followed as it is, a redundant description will be omitted.

In step S537 of FIG. 5, a CU 534 transmits an F1 or W1 message (e.g., UE CONTEXT MODIFICATION REQUEST message) to a DU 532 in order to update configuration information for communication with a relay UE 520. The F1 or W1 message (e.g., UE CONTEXT MODIFICATION REQUEST message) transmitted in step S537 may include RB setup/modification information (e.g., relay radio bearer setup/modification info) for transmission of user plane data and CP signaling (RRC message) exchanged between the base station and a remote UE 510, relay RB mapping information (e.g., relay RB mapping config info) for transmission of user plane data of the remote UE and/or sidelink radio bearer (SL RB) setup/modification information (e.g., sidelink radio bearer setup/modification info) for direct communication between the relay UE 520 and the remote UE 510. Relay RB mapping information (e.g., relay RB mapping config info) for transmission of user plane data of the remote UE may include data radio bearer (DRB) associated with a UE user plane GPRS tunneling protocol (GTP) tunnel (e.g., F1-U or W1-U GTP tunnel for each radio bearer) used between the CU 534 and DU 532 for a user plane data transmission service of the remote UE and mapping information of RB for transmission of user plane data of the base station and the remote UE 510.

The F1 or W1 message (e.g., UE CONTEXT MODIFI-CATION REQUEST message) transmitted in step S537 may additionally include configuration information for the remote UE 510, and configuration information for the remote UE 510 may include remote UE identifier (e.g., remote UE identification) information, sidelink radio bearer (SL RB) setup/modification information (e.g., remote UE sidelink radio bearer setup/modification info) for direct communication of the remote UE 510 and the relay UE 520 and/or communication capability information (Remote UE-capability info) of the remote UE 510.

In step S537, the DU 532 that has received context change request information for the relay UE 520 from the CU 534 completes a configuration for the relay UE 520 and/or the remote UE 510 and then transmits an F1 or W1 message (e.g., UE CONTEXT MODIFICATION RESPONSE message) responding to completion of configuration for the corresponding UE to the CU 534 in step S538. The F1 or W1 message (e.g., UE CONTEXT MODIFICATION RESPONSE message) transmitted in step S538 includes RB setup/modification information (e.g., RelayRBConfig IE) of the relay UE 520 for transmission of user plane data and CP signaling (RRC message) exchanged between the base station and the remote UE 510 to be transmitted to the relay UE 120 and/or sidelink radio bearer (SL RB) setup/modification information (e.g., SidelinkConfig IE) for direct communication between the relay UE 520 and the remote UE 510. Further, the F1 or W1 message (e.g., UE CONTEXT MODIFICATION RESPONSE message) transmitted in step S538 may include sidelink radio bearer (SL RB) setup/modification information (e.g., Remote UE SidelinkConfig IE) for direct communication between the remote UE 510 and the relay UE to be transmitted to the remote UE 510 and remote UE identifier (e.g., remote UE identification) information.

In step S538, the CU 534 that has received a response message (e.g., UE CONTEXT SETUP RESPONSE message) to the context change request from the DU 532 generates an RRC connection reconfiguration message (e.g., RRCReconfiguration message) including configuration information of the relay UE 520 included in the response message to the context configuration request and then transmits the RRC message to the DU 532 using the F1 or W1 message (e.g., DL RRC MESSAGE TRANSFER message) in step S539.

In step S540, the DU 532 transmits the RRC message received from the CU 534 in step S539 to the relay UE 520. In step S541, the relay UE 520 that has received an RRC connection reconfiguration message (e.g., RRCReconfiguration message) from the base station performs an internal configuration based on information included in the message and then transmits an RRC connection reconfiguration complete message (e.g., RRCReconfigurationComplete message) to the base station 530. In step S542, the DU 532 that has received the RRC message from the relay UE 520 transmits the RRC message to the CU 534 using the F1 or W1 message (e.g., UL RRC MESSAGE TRANSFER message).

Thereafter, the procedure of steps S245 to S251 of FIG. 2 is followed as it is.

Figure 6:
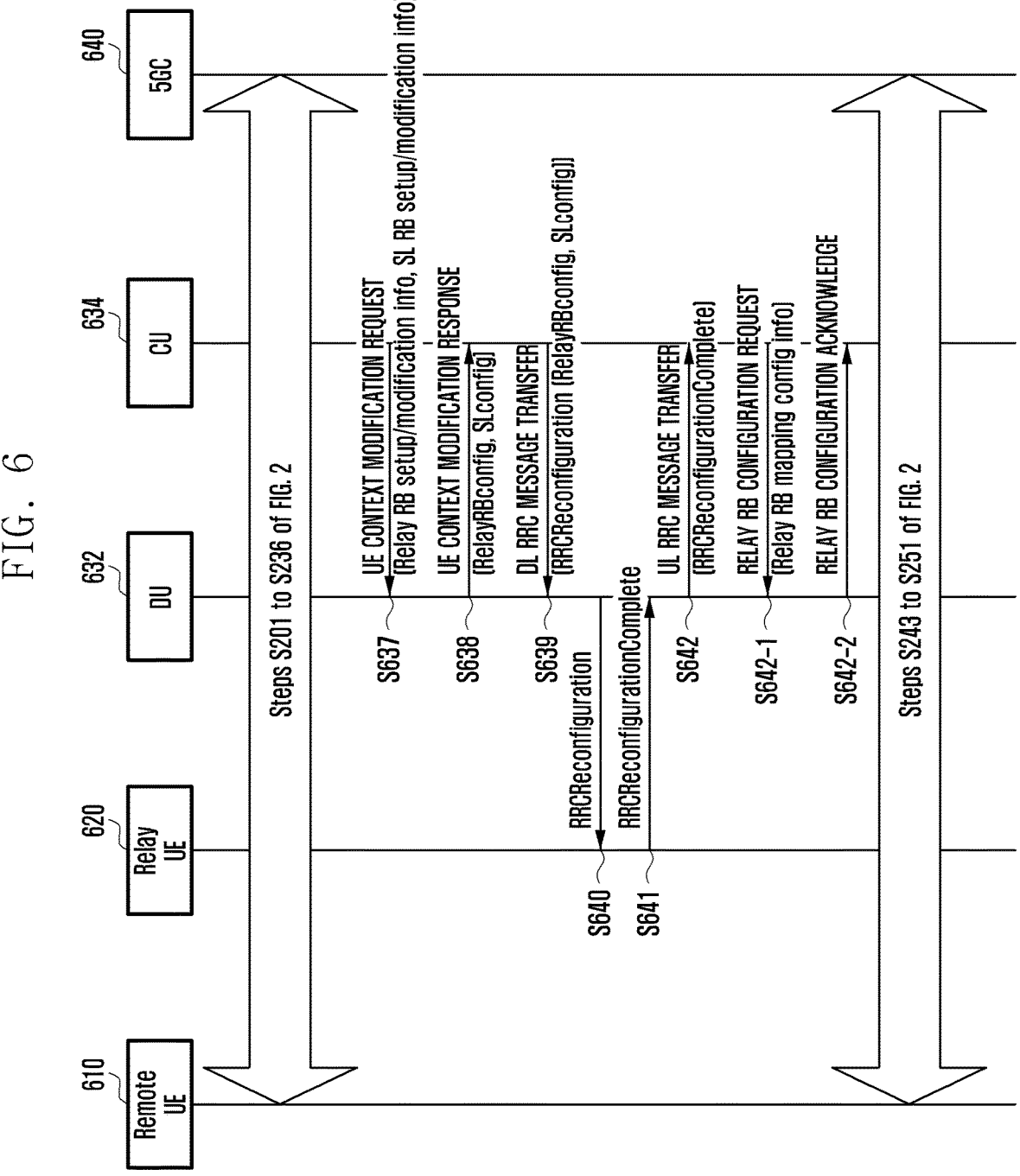
FIG. 6 is a signal flow diagram illustrating a procedure for configuring relay radio bearer (RB) mapping of a remote UE as a separate message according to an embodiment of the disclosure.

FIG. 6 is a signal flow diagram illustrating a procedure for configuring relay RB mapping information (e.g., relay RB mapping config info) for transmission user plane data of the remote UE using a separate message in a procedure of using UE-association signaling configured between the CU 134 and the DU 132 for the relay UE 120 in a control information transmission method and processing method between the CU 134 and the DU 132 for enabling to transmit control plane signaling and user plane data between the remote UE 110 and the base station according to the embodiment of FIG. 2.

With reference to FIG. 6, the procedure of steps S201 to S236 of FIG. 2 is followed as it is.

In step S637 of FIG. 6, a CU 634 transmits an F1 or W1 message (e.g., UE CONTEXT MODIFICATION REQUEST message) to a DU 632 in order to update configuration information for communication with a relay UE 620. The F1 or W1 message (e.g., UE CONTEXT MODIFICATION REQUEST message) transmitted in step S637 may include RB setup/modification information (e.g., relay radio bearer setup/modification info) for transmission of user plane data and CP signaling (RRC message) exchanged between the base station and a remote UE 610 and/or sidelink radio bearer (SL RB) setup/modification information (e.g., sidelink radio bearer setup/modification info) for direct communication between the relay UE 620 and the remote UE 610.

In step S637, the DU 632 that has received context change request information for the relay UE 620 from the CU 634 completes a configuration for the relay UE 620 and then transmits an F1 or W1 message (e.g., UE CONTEXT MODIFICATION RESPONSE message) responding to completion of configuration for the corresponding UE to the CU 634 in step S639. The F1 or W1 message (e.g., UE CONTEXT MODIFICATION RESPONSE message) transmitted in step S639 includes RB setup/modification information (e.g., RelayRBConfig IE) of the relay UE 620 for transmission of user plane data and CP signaling (RRC message) exchanged between the base station and the remote UE 610 to be transmitted to the relay UE 620 and/or sidelink radio bearer (SL RB) setup/modification information (e.g., SidelinkConfig IE) for direct communication between the relay UE 120 and the remote UE 610.

In step S638, the CU 634 that has received a response message (e.g., UE CONTEXT SETUP RESPONSE message) to the context change request from the DU 632 generates an RRC connection reconfiguration message (e.g., RRCReconfiguration message) including configuration information of the relay UE 620 included in the response message to the context configuration request and then transmits the RRC message to the DU 632 using the F1 or W1 message (e.g., DL RRC MESSAGE TRANSFER message) in step S639.

In step S640, the DU 632 transmits the RRC message received from the CU 634 in step S639 to the relay UE 620. In step S641, the relay UE 620 that has received an RRC connection reconfiguration message (e.g., RRCReconfiguration message) from the base station 630 performs internal configuration based on information included in the message and then transmits an RRC connection reconfiguration complete message (e.g., RRCReconfigurationComplete message) to the base station. In step S642, the DU 632 that has received the RRC message from the relay UE 620 transmits the RRC message to the CU 634 using the F1 or W1 message (e.g., UL RRC MESSAGE TRANSFER message).

In step S642-1, the CU 634 transmits an F1 or W1 message (e.g., RELAY RB CONFIGURATION REQUEST message) in order to configure relay RB mapping for transmission of user plane data of the remote UE to the DU 632. The F1 or W1 message (e.g., RELAY RB CONFIGURA-TION REQUEST message) transmitted in step S642-1 includes relay RB mapping information (e.g., relay RB mapping config info) for transmission of user plane data of the remote UE. Relay RB mapping information (e.g., relay RB mapping config info) for transmission of user plane data of the remote UE may include data radio bearer (DRB) associated with a UE user plane GPRS tunneling protocol (GTP) tunnel (e.g., F1-U or W1-U GTP tunnel for each radio bearer) used between the CU 634 and the DU 632 for a user plane data transmission service of the remote UE and mapping information of RB for transmission of user plane data of the base station and the remote UE 610.

In step S642-1, the DU 632 that has received relay RB mapping configuration request information for transmission of user plane data of the remote UE from the CU 634 completes the relay RB mapping configuration and then transmits an F1 or W1 message (e.g., RELAY RB CON-FIGURATION ACKNOWLEDGE message) responding to completion of the configuration to the CU 634 in step S642-2.

Thereafter, the procedure of steps S243 to S251 of FIG. 2 is followed as it is.

FIG. 7 illustrates an example of a constitution of an F1 or W1 message (e.g., UE CONTEXT SETUP REQUEST message) including configuration information for communica-tion with the relay UE used in step S211 of FIG. 2.

The F1 or W1 message (e.g., UE CONTEXT SETUP REQUEST message) including configuration information for communication with the relay UE includes message type information for distinguishing a message type and an iden-tifier, for example, a gNB-CU UE F1AP ID and a gNB-DU UE F1AP ID for distinguishing the UE in UE-associated signaling. In FIG. 2, identifier information for distinguishing the UE in UE-associated signaling enables to transmit control information between the CU and the DU for the remote UE using identifier information configured for the relay UE. In addition, the F1 or W1 message (e.g., UE CONTEXT SETUP REQUEST message) may include the following information, and names used in the embodiments may be replaced with other names.

An indicator (e.g., sidelink relay UE indication IE) that the UE will perform a relay function RB setup information (e.g., Relay RB to Be Setup List IE) for transmission of CP signaling (RRC messages) exchanged between the base station and the remote UE 110

SRB ID: Signaling Radio Bearer identification informa-tion

Sidelink radio bearer (SL RB) setup information (e.g., SL DRB to Be Setup List IE) for direct communication between the relay UE 120 and the remote UE 110

SL DRB ID: Sidelink Data Radio Bearer identification information

SL DRB QoS: Sidelink Data Radio Bearer QoS informa-tion

PC5 QoS Flow Identifier: Identifier that distinguishes sidelink QoS flow between the UE and the network.

RLC mode: operation mode of RLC operating in SL DRB

FIGS. 8AA, 8AB, 8BA, 8BB, and 8C illustrate an example of a constitution of an F1 or W1 message (e.g., UE CONTEXT MODIFICATION REQUEST message) for updating configuration information for communication with the relay UE used in step S237 of FIG. 2, step S537 of FIG. 5, and step S637 of FIG. 6. It is preferable to understand that FIGS. 8AA, 8AB, 8BA, 8BB, and 8C are connected to each other to form one message.

The F1 or W1 message (e.g., UE CONTEXT MODIFI-CATION REQUEST message) for updating configuration information for communication with the relay UE includes message type information for distinguishing a message type and an identifier, for example, a gNB-CU UE F1AP ID and a gNB-DU UE F1AP ID for distinguishing the UE in UE-associated signaling. In FIGS. 2, 5, and 6, identifier information for distinguishing the UE in UE-associated signaling enables to transmit control information between the CU and the DU for the remote UE using identifier information configured for the relay UE. In addition, the F1 or W1 message (e.g., UE CONTEXT MODIFICATION REQUEST message) may include the following informa-tion, and names used in the embodiments may be replaced with other names.

RB setup information (e.g., Relay RB to Be Setup List IE) for transmission of user plane data and CP signaling (RRC message) exchanged between the base station and the remote UE.

SRB ID: Signaling Radio Bearer identification informa-tion

DRB ID: Data Radio Bearer identification information

QOS information: QoS related information associated with DRB

UL UP TNL information: F1-U tunnel information (trans-port network layer information) for transmitting user plane data transmitted through DRB from the DU to the CU.

RB modification information (e.g., Relay RB to Be Modi-fied List IE) for transmission of user plane data exchanged between the base station and the remote UE DRB ID: Data Radio Bearer identification information QOS information: QoS related information associated with DRB UL UP TNL information: F1-U tunnel information (trans-port network layer information) for transmitting user plane data transmitted through DRB from the DU to the CU.

RB release information (e.g., Relay RB to Be Released List IE) for transmission of user plane data exchanged between the base station and the remote UE SRB ID: Signaling Radio Bearer identification informa-tion DRB ID: Data Radio Bearer identification information Sidelink radio bearer (SL RB) setup information (e.g., SL DRB to Be Setup List IE) for direct communication between the relay UE and the remote UE SL DRB ID: Sidelink Data Radio Bearer identification information SL DRB QoS: Sidelink Data Radio Bearer QoS informa-tion PC5 QoS Flow Identifier: Identifier that distinguishes sidelink QoS flow between the UE and the network.

RLC mode: operation mode of RLC operating in SL DRB

Sidelink radio bearer (SL RB) modification information (e.g., SL DRB to Be Modified List IE) for direct communication between the relay UE and the remote UE SL DRB ID: Sidelink Data Radio Bearer identification information SL DRB QoS: Sidelink Data Radio Bearer QoS information PC5 QoS Flow Identifier: Identifier that distinguishes sidelink QoS flow between the UE and the network.

RLC mode: operation mode of RLC operating in SL DRB

Sidelink radio bearer (SL RB) release information (e.g., SL DRB to Be Released List IE) for direct communication between the relay UE and the remote UE SL DRB ID: Sidelink Data Radio Bearer identification information Mapping configuration information (e.g., Relay RB Mapping Information Added List IE) of RB for transmission of user plane data of the base station and the remote UE Remote UE ID: Remote UE identification information RB ID: Signaling/Data Radio Bearer identification information Relay RB ID: Relay Radio Bearer identification information Mapping modification information (e.g., Relay RB Mapping Information Modified List IE) of RB for transmission of user plane data of the base station and the remote UE Remote UE ID: Remote UE identification information RB ID: Signaling/Data Radio Bearer identification information Relay RB ID: Relay Radio Bearer identification information Mapping release information (e.g., Relay RB Mapping Information Removed List IE) of RB for transmission of user plane data of the base station and the remote UE Remote UE ID: Remote UE identification information RB ID: Signaling/Data Radio Bearer identification information FIG. 9 illustrates an example of a constitution of an F1 or W1 message (e.g., UE CONTEXT SETUP/MODIFICATION RESPONSE message) for responding to completion of setup or modification of configuration information for communication with a relay UE used in steps S213 and S238 of FIG. 2, step S538 of FIG. 5, and step S638 of FIG. 6.

The F1 or W1 message (e.g., UE CONTEXT SETUP/MODIFICATION REQUEST message) for an update completion response of configuration information for communication with the relay UE includes message type information for distinguishing a message type and an identifier, for example, a gNB-CU UE F1AP ID and a gNB-DU UE F1AP ID for distinguishing the UE in UE-associated signaling. In FIGS. 2, 5, and 6, identifier information for distinguishing the UE in UE-associated signaling enables to transmit control information between the CU and the DU for the remote UE using identifier information configured for the relay UE. In addition, the F1 or W1 message (e.g., UE CONTEXT SETUP/MODIFICATION REQUEST message) may include the following information to be included in the RRC message to be transmitted to the relay UE, and names used in the embodiments may be replaced with other names.

SL-PHY-MAC-RLC-Config: Sidelink radio bearer (SL RB) setup/modification information for direct communication between the relay UE and the remote UE 110

Relay RB-Config: RB setup/modification information of the relay UE for transmission of user plane data and CP signaling (RRC message) exchanged between the base station and the remote UE FIG. 10 illustrates an example of a constitution of an F1 or W1 message (e.g., INITIAL UL RELAY RRC MES- SAGE TRANSFER, UL RELAY RRC MESSAGE TRANSFER, DL RELAY RRC MESSAGE TRANSFER) for transmitting an RRC message of the remote UE used in steps S222, S223, and S228 of FIG. 2, steps S322 and S323 of FIG. 3, and steps S422 and S423 of FIG. 4.

A message name used in the embodiment is an example, and other names may be used. The F1 or W1 message (e.g., INITIAL UL RELAY RRC MESSAGE TRANSFER, UL RELAY RRC MESSAGE TRANSFER, DL RELAY RRC MESSAGE TRANSFER) for transmitting an RRC message of the remote UE may include message type information for distinguishing a message type and an identifier, for example, a gNB-CU UE F1AP ID and a gNB-DU UE F1AP ID for distinguishing the UE in UE-associated signaling, and an F1 or W1 message (e.g., INITIAL UL RELAY RRC MESSAGE TRANSFER) used for transmitting a first RRC message of the remote UE may include only a gNB-DU UE F1AP ID.

In FIGS. 2, 3, and 4, identifier information for distinguishing the UE in UE-associated signaling enables to transmit control information between the CU and the DU for the remote UE using identifier information configured for the relay UE. In addition, the F1 or W1 message (e.g., INITIAL UL RELAY RRC MESSAGE TRANSFER, UL RELAY RRC MESSAGE TRANSFER, and DL RELAY RRC MESSAGE TRANSFER messages) may include the following information to be included in the RRC message to be transmitted to the relay UE, and names used in the embodiments may be replaced with other names.

Remote UE ID: Remote UE identification information

SRB ID: Signaling Radio Bearer identification information

RRC-Container: RRC message for the remote UE

FIG. 11 illustrates an example of a constitution of an S1/NG INITIAL UE MESSSAGE message transmitted by the base station to the core network in order to configure a context of the remote UE used in step S229 of FIG. 2. The INITIAL UE MESSAGE may include indication information (e.g., remote UE indication IE) indicating whether the UE operates as the remote UE.

FIG. 12 illustrates an example of a constitution of an S1/NG INITIAL CONTEXT SETUP REQUEST message transmitted from the core network to the base station in order to configure a context of the UE to the base station used in step S230 of FIG. 2. An INITIAL CONTEXT SETUP REQUEST may include authorization information (e.g., Remote UE Service Authorized IE) indicating whether the UE is capable of providing a service to the remote UE.

FIGS. 13AA, 13AB, and 13B illustrate an example of a constitution of an F1 or W1 message (e.g., REMOTE UE CONTEXT SETUP/MODIFICATION REQUEST message) for sidelink radio bearer (SL RB) setup/modification for direct communication between the remote UE and the relay UE used in step S243 of FIG. 2. It is preferable to understand that FIGS. 13AA, 13AB, and 13B are connected to each other to form one message.

The message name used in the embodiment is an example, and other names may be used. The F1 or W1 message (e.g., REMOTE UE CONTEXT SETUP/MODIFICATION REQUEST message) for sidelink radio bearer (SL RB) setup/modification for direct communication between the remote UE 110 and the relay UE may include message type information for distinguishing a message type and an identifier, for example, a gNB-CU UE F1AP ID and a gNB-DU UE F1AP ID for distinguishing the UE in UE-associated signaling. In FIG. 2, identifier information for distinguishing the UE in UE-associated signaling enables to transmit control information between the CU and the DU for the remote UE using identifier information configured for the relay UE. In addition, the F1 or W1 message (e.g., REMOTE UE CONTEXT SETUP/MODIFICATION REQUEST message) may include the following information, and names used in the embodiments may be replaced with other names.

Remote UE ID: Remote UE identification information

UE-CapabilityRAT-ContainerList: Radio capability information of the remote UE

Sidelink radio bearer (SL RB) configuration information (e.g., SL DRB to Be Setup List IE) for direct communication between the relay UE and the remote UE SL DRB ID: Sidelink Data Radio Bearer identification information SL DRB QoS: Sidelink Data Radio Bearer QoS information PC5 QoS Flow Identifier: Identifier that distinguishes sidelink QoS flow between the UE and the network.

RLC mode: operation mode of RLC operating in SL DRB

Sidelink radio bearer (SL RB) modification information (e.g., SL DRB to Be Modified List IE) for direct communication between the relay UE and the remote UE SL DRB ID: Sidelink Data Radio Bearer identification information SL DRB QoS: Sidelink Data Radio Bearer QoS information PC5 QoS Flow Identifier: Identifier that distinguishes sidelink QoS flow between the UE and the network.

RLC mode: operation mode of RLC operating in SL DRB

Sidelink radio bearer (SL RB) release information (e.g., SL DRB to Be Released List IE) for direct communication between the relay UE and the remote UE SL DRB ID: Sidelink Data Radio Bearer identification information FIG. 14 illustrates an example of a constitution of an F1 or W1 message (e.g., REMOTE UE CONTEXT SETUP/MODIFICATION RESPONSE message) for responding to completion of setup or modification for the remote UE used in step S244 of FIG. 2. The F1 or W1 message (e.g., REMOTE UE CONTEXT SETUP/MODIFICATION RESPONSE message) for setup or modification completion response for the remote UE includes message type information for distinguishing a message type and an identifier, for example, a gNB-CU UE F1AP ID and a gNB-DU UE F1AP ID for distinguishing the UE in UE-associated signaling. In FIG. 2, identifier information for distinguishing the UE in UE-associated signaling enables to transmit control information between the CU and the DU for the remote UE using identifier information configured for the relay UE. In addition, the F1 or W1 message (e.g., REMOTE UE CONTEXT SETUP/MODIFICATION RESPONSE message) may include the following information to be included in the RRC message to be transmitted to the remote UE, and names used in the embodiments may be replaced with other names.

SL-PHY-MAC-RLC-Config: Sidelink radio bearer (SL RB) setup/modification information for direct communication between the relay UE and the remote UE FIG. 15 illustrates an example of a constitution of an F1 or W1 message (e.g., RELAY RB CONFIGURATION REQUEST message) for configuring relay RB mapping for transmission of user plane data of the remote UE used in step S642-1 of FIG. 6.

In order to configure relay RB mapping for transmission of user plane data of the remote UE, the F1 or W1 message (e.g., RELAY RB CONFIGURATION REQUEST message) includes message type information for distinguishing a message type and an identifier, for example, a gNB-CU UE F1AP ID and a gNB-DU UE F1AP ID for distinguishing the UE in UE-associated signaling. In FIG. 15, identifier information for distinguishing the UE in UE-associated signaling enables to transmit control information between the CU and the DU for the remote UE using identifier information configured for the relay UE. In addition, the F1 or W1 message (e.g., REMOTE UE CONTEXT SETUP/MODIFICATION RESPONSE message) may include the following information, and names used in the embodiments may be replaced with other names.

Mapping configuration information (e.g., Relay RB Mapping Information Added List IE) of RB for transmission of user plane data of the base station and the remote UE Remote UE ID: Remote UE identification information RB ID: Signaling/Data Radio Bearer identification information Relay RB ID: Relay Radio Bearer identification information Mapping modification information (e.g., Relay RB Mapping Information Modified List IE) of RB for transmission of user plane data of the base station and the remote UE Remote UE ID: Remote UE identification information RB ID: Signaling/Data Radio Bearer identification information Relay RB ID: Relay Radio Bearer identification information Mapping release information (e.g., Relay RB Mapping Information Removed List IE) of RB for transmission of user plane data of the base station and the remote UE Remote UE ID: Remote UE identification information RB ID: Signaling/Data Radio Bearer identification information FIG. 16 is a flowchart illustrating operations and message processing in a DU when the DU of a base station according to an embodiment of using UE-associated signaling for the relay UE receives control plane signaling (e.g., RRC message) or user plane data from the relay UE.

Figure 16:
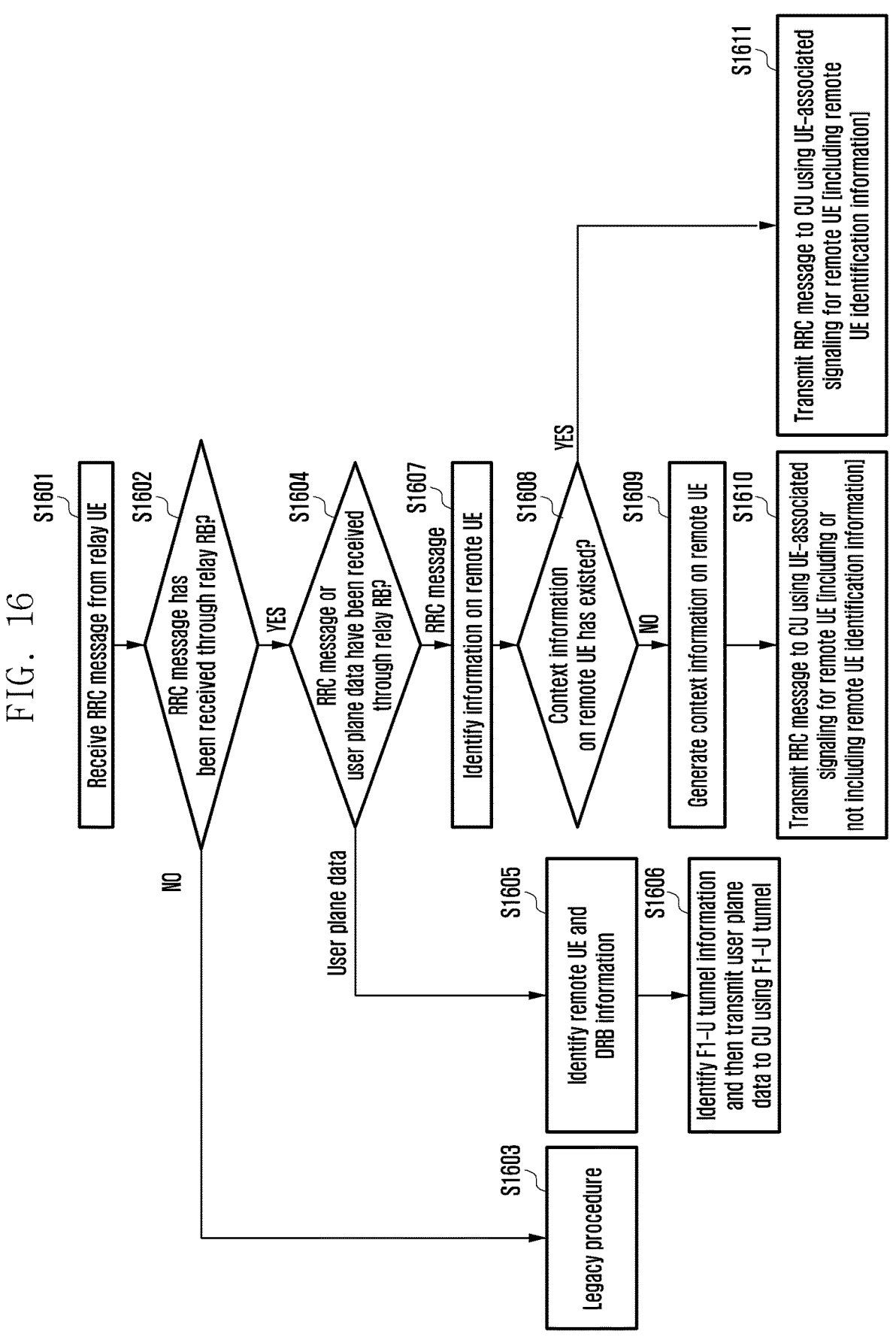
FIG. 16 is a flowchart illustrating operations and message processing when a DU of a base station receives a control message or user plane data from a relay UE according to an embodiment of the disclosure.

With reference to FIG. 16, in step S1601, when control plane signaling (e.g., RRC message) or user plane data are received from the relay UE, in step S1602, the DU identifies whether control plane signaling (e.g., RRC message) or user plane data have been received through the relay RB. If control plane signaling (e.g., RRC message) or user plane data have not been received through the relay RB in step S1602, in step S1603, a reception procedure from the UE as in the legacy procedure is performed.

In the case that control plane signaling (e.g., RRC message) or user plane data have been received through the relay RB in step S1602, in step S1604, the DU identifies whether control plane signaling (e.g., RRC message) or user plane data have been received through the relay RB. In the case that user plane data have been received in step S1604, in step S1605, the DU identifies information on the remote UE and data radio bearer (DRB) information using header information (e.g., a header of an adaptation layer) included when user plane data transmitted by the relay UE are transmitted. In step S1606, the DU identifies UE user plane GPRS tunneling protocol (GTP) tunnel (e.g., F1-U or W1-U GTP for each radio bearer) information used between the CU and the DU corresponding to data radio bearer (DRB) and the remote UE and then transmits user plane data to the CU using the tunnel.

In the case that control plane signaling (e.g., RRC message) has been received through the relay RB in step S1604, in step S1607, the DU identifies information on the remote UE and data radio bearer (DRB) information using header information (e.g., a header of an adaptation layer) included when control plane signaling (e.g., RRC message) transmitted by the relay UE is transmitted.

In step S1608, the DU determines whether context information on the identified remote UE has already been generated and stored in the DU. In step S1608, in the case of a newly accessed remote UE without context information on the identified remote UE, in step S1609, the DU generates and stores a context information for the remote UE, and in step S1610, the DU transmits control plane signaling (e.g., RRC message) to the CU using UE-associated signaling for the relay UE, and according to the embodiment, the control plane signaling may include an identifier for the remote UE 110.

In step S1608, in the case that context information on the identified remote UE is already stored in the DU, in step S1611, the DU transmits control plane signaling (e.g., RRC message) to the CU using UE-associated signaling for the relay UE, and the CP signaling includes an identifier for the remote UE.

Figure 17:
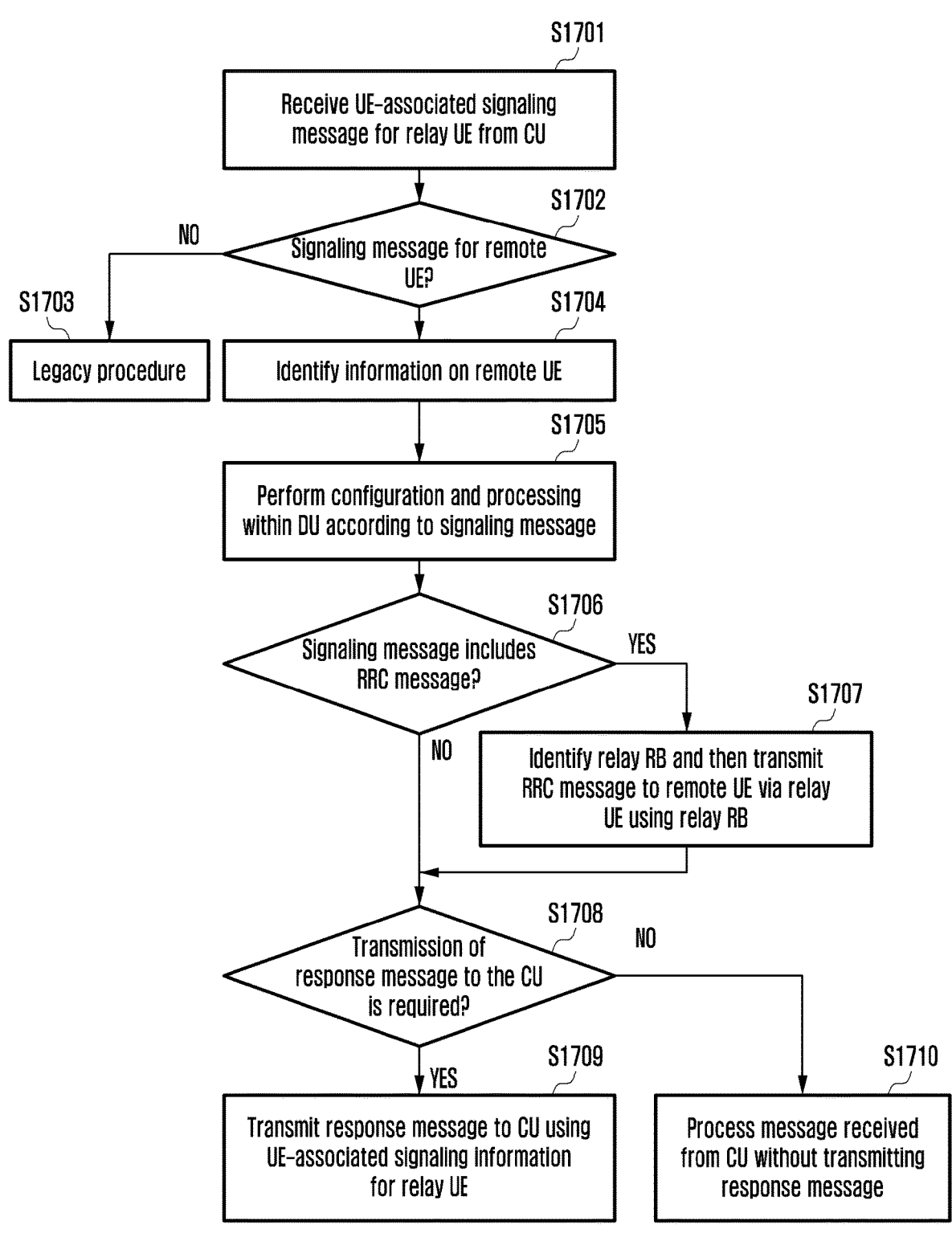
FIG. 17 is a flowchart illustrating operations and message processing in a DU when the DU of a base station receives an F1 or W1 UE-associated signaling message for a relay UE from a CU according to an embodiment of the disclosure.

FIG. 17 is a flowchart illustrating operations and message processing in a DU when the DU of a base station according to an embodiment using UE-associated signaling for a relay UE receives an F1 or W1 UE-associated signaling message for the relay UE from a CU.

With reference to FIG. 17, in step S1701, the DU receives an F1 or W1 UE-associated signaling message for the relay UE, and in step S1702, the DU identifies whether the received F1 or W1 UE-associated signaling message is a message for a configuration related to the remote UE. Whether the received F1 or W1 UE-associated signaling message is a message for a configuration related to the remote UE may be determined by whether the received UE-associated signaling message for the relay UE includes identifier information of the remote UE or whether it is a dedicated F1 or W1 UE-associated signaling message for a configuring related to the remote UE.

In step S1702, in the case that the message is a message only for the relay UE rather than the remote UE, in step S1703, the process is performed according to the legacy DU procedure. In the case that the message is a message for a configuring related to the remote UE in step S1702, in step S1704, the DU identifies information on the remote UE. Identification of the remote UE uses remote UE identifier information included in the message. In step S1705, the DU performs a configuration and processing within the DU according to the received message and information included in the message. In step S1706, the DU identifies whether the signaling message includes control plane signaling (e.g., RRC message) to be transmitted to the remote UE, and in the case that the signaling message includes control plane signaling, in step S1707, the DU identifies relay RB information for transmission to the corresponding remote UE and then transmits control plane signaling (e.g., RRC message) to the remote UE via the relay UE using the corresponding relay RB. When the control message (e.g., RRC message) to the remote UE is not included in step S1706 or when transmission of the control message (e.g., RRC message) to the remote UE is completed in step S1707, in step S1708, the DU identifies whether the F1 or W1 UE-associated signaling message received from the CU should transmit a response message to the CU. If transmission of a response message is required in step S1708, in step S1709, the DU transmits the corresponding response message to the CU. If transmission of the response message is not required, in step S1710, the DU processes the F1 or W1 UE-associated signaling message received from the CU without transmitting the response message.

Figure 18A:
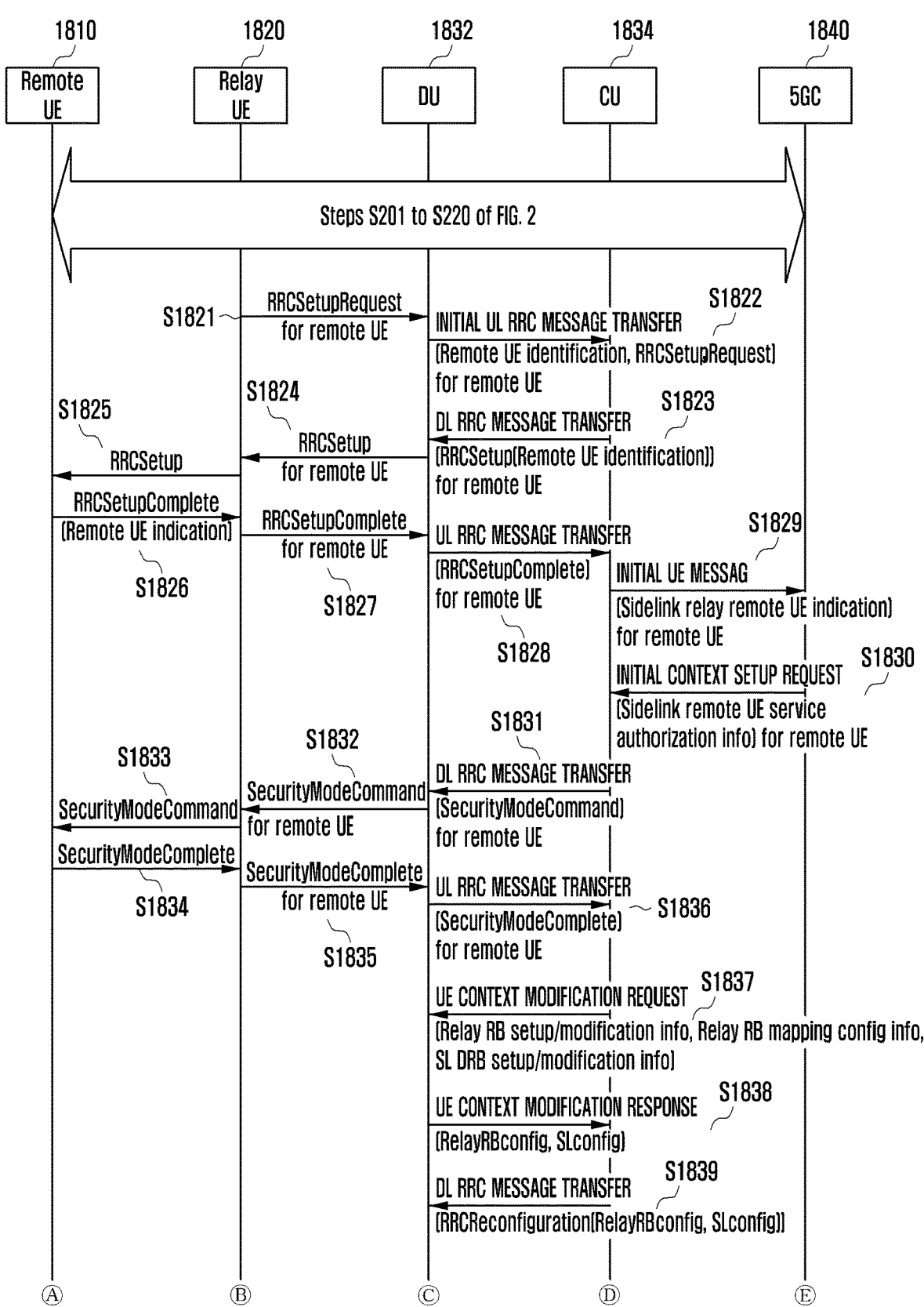
FIG. 18A is a signal flow diagram illustrating a procedure of using separate UE-association signaling for a remote UE between a CU and a DU according to an embodiment of the disclosure.
Figure 18B:
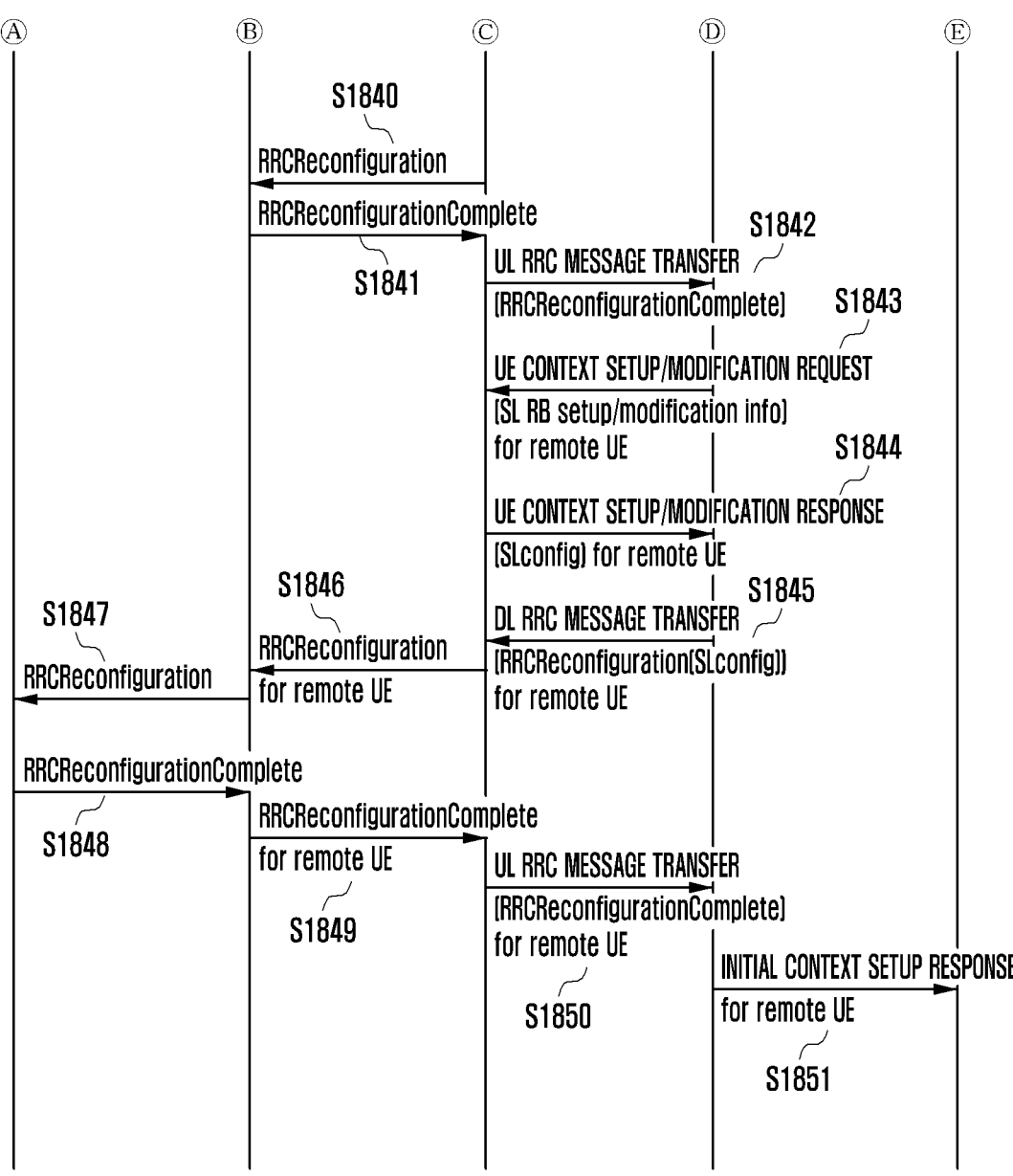
FIG. 18B is a signal flow diagram illustrating a procedure of using separate UE-association signaling for a remote UE between a CU and a DU according to an embodiment of the disclosure.

FIGS. 18A and 18B are signal flow diagrams illustrating a procedure of using UE-association signaling between a CU and a DU separately for a remote UE in a control information transmission method and processing method between the CU and the DU for enabling to transmit control plane signaling and user plane data between the remote UE and a base station according to an embodiment.

In FIGS. 18A and 18B, the procedure of steps S201 to S220 of FIG. 2 is followed as it is.

With reference to FIGS. 18A and 18B, in step S1821, when the relay UE completes RRC connection establishment with the base station, a relay UE 1820 transmits an RRC connection request message (e.g., RRCSetupRequest message) of a remote UE 1810 received from the remote UE 1810 to the base station using the configured relay RB. In step S1821, when a DU 1832 receives the RRC message of the remote UE 1810 through the configured relay RB, the DU 1832 identifies information on the remote UE. Information of the remote UE may be identified using received relay RB information or header information (e.g., a header of an adaptation layer) included when transmitting the RRC message.

After the DU 1832 receives the RRC message of the remote UE 1810 in step S1821, in the case that the remote UE is not identified, that is, in the case that the RRC message is a first RRC message (e.g., RRCSetupRequest message) transmitted by the remote UE, in step S1822, the DU 1832 generates UE-association for signal processing for a new UE, that is, the remote UE 1810, and then transmits an RRC message of the remote UE 1810 to a CU 1834 using an F1 or W1 message (e.g., INITIAL UE RRC MESSAGE TRANSFER message) including new UE-association information (e.g., new gNB-DU UE F1AP ID). The F1 or W1 message (e.g., INITIAL UE RRC MESSAGE TRANSFER message) transmitted in step S1822 may include remote UE identifier (e.g., remote UE identification) information in which the DU 1832 uses for distinguishing the corresponding remote UE 1810. The F1 or W1 message (e.g., INITIAL UE RRC MESSAGE TRANSFER message) transmitted in step S1822 is a UE-associated signaling message in an F1 or W1 interface and is used as a UE-associated signaling message configured for the remote UE 1810.

In step S1822, the CU 1834 that has received the RRC connection request message (e.g., RRCSetupRequest message) transmitted by the remote UE 1810 generates an RRC connection setup message (e.g., RRCSetup message) transmitted to the remote UE 1810 and then transmits the RRC connection setup message to the DU 1832 using the F1 or W1 message (e.g., DL RRC MESSAGE TRANSFER message) in step S1823. The F1 or W1 message transmitted in step S1823 is a UE-associated signaling message configured for the remote UE 1810.

In step S1823, the DU 1832 that has received the RRC message to be transmitted to the remote UE 1810 included in a UE-associated signaling message (e.g., DL RRC MESSAGE TRANSFER message) configured for the remote UE 1810 from the CU 1834 includes identification information for distinguishing the remote UE in header information (e.g., a header of an adaptation layer) constituted to transmit the RRC message and/or transmits the information to the relay UE 1820 using relay RB in step S1824. In step S1825, the relay UE 1820 that has received the RRC message to be transmitted from the base station to the remote UE identifies the remote UE and then transmits a remote UE RRC message to the remote UE 1810 using the PC5 link.

In step S1826, the remote UE 1810 that has received an RRC connection setup message (e.g., RRCSetup message) transmitted by the base station through the relay UE 1820 transmits an RRC connection setup complete message (e.g., RRCSetupComplete message) to the relay UE 120 using the PC5 link. The RRC connection setup complete message (e.g., RRCSetupComplete message) transmitted in step S1826 may include an indicator (e.g., remote UE indication) indicating the remote UE. The relay UE 1820 that has received an RRC connection setup complete message (e.g., RRCSetupComplete message) from the remote UE 1810 transmits an RRC connection setup complete message (e.g., RRCSetupComplete message) of the remote UE 1810 to the base station using the configured relay RB in step S1827. In step S1827, when the DU 1832 receives the RRC message of the remote UE 1810 through the configured relay RB, the DU 1832 identifies information on the remote UE 1810. Information of the remote UE may be identified using received relay RB information or header information (e.g., a header of an adaptation layer) included when transmitting the RRC message. In step S1828, the DU 1832 configures UE-association signaling using the identified remote UE information and transmits the RRC message of the remote UE 110 to the CU 1834 using the F1 or W1 message (e.g., UL RRC MESSAGE TRANSFER message). The F1 or W1 message transmitted in step S1828 is a UE-associated signaling message configured for the remote UE.

In step S1829, the CU 1834 that has received the RRC connection setup complete message transmitted by the remote UE 1820 from the DU 1832 transmits an INITIAL UE message to a core network 1840 for a context configuration of the remote UE 120 and for example, in the core network 1840, an access and mobility management function (AMF) or a mobility management entity (MME) receives an INITIAL UE message transmitted by the base station. The INITIAL UE MESSSAGE message transmitted in step S1829 may include an indicator (e.g., remote UE indication) that the corresponding UE will operate as the remote UE. The core network 1840 identifies whether the corresponding UE is a UE permitted to operate as the remote UE, and in the case that the corresponding IE is a permitted UE, in step S1830, the core network 1840 transmits an INITIAL CONTEXT SETUP REQUEST message to the base station for a context configuration of the UE. The INITIAL CONTEXT SETUP REQUEST message transmitted in step S1830 includes an indicator (e.g., remote UE service authorized indication) that the corresponding UE is a UE permitted to operate as the remote UE. The message used in step S1829 may be an example of a constitution of the INITIAL UE MESSSAGE message of FIG. 11, and the message used in step S1830 may use an example of a constitution of the INITIAL CONTEXT SETUP REQUEST message of FIG. 12.

When the CU 1834 of the base station receives the INITIAL CONTEXT SETUP REQUEST message from the core network 1840, the CU 1834 generates an RRC SecurityModeCommand message for security configuration with the remote UE 1810 and then includes an RRC Security-ModeCommand message transmitted to the remote UE 1810 in an F1 or W1 message (e.g., DL RRC MESSAGE TRANS-FER message) for transmission to the remote UE 1810 and transmits the message to the DU 1832 in step S1831. The F1 or W1 message transmitted in step S1831 is a UE-associated signaling message configured for the remote UE.

In step S1831, the DU 1832 that has received the RRC message to be transmitted from the CU 1834 to the remote UE 1810 includes identification information for distinguishing a remote UE in header information (e.g., a header of an adaptation layer) constituted to transmit the RRC message and/or transmits the information to the relay UE 1820 using relay RB in step S1832. In step S1833, the relay UE 1820 that has received the RRC message to be transmitted from the base station to the remote UE identifies the remote UE and then transmits a remote UE RRC message to the remote UE 1810 using the PC5 link.

In step S1833, the remote UE 1810 that has received the RRC SecurityModeCommand message transmitted by the base station from the relay UE 1820 generates an RRC SecurityModeComplete message and then transmits the RRC SecurityModeComplete message to the relay UE 1820 using the PC5 link in step S1834. In step S1835, the relay UE 1820 that has received the RRC SecurityModeComplete message from the remote UE 1810 transmits the RRC SecurityModeComplete message of the remote UE 1810 using the configured relay RB to the base station. In step S1835, when the DU 1832 receives the RRC message of the remote UE 1810 through the configured relay RB, the DU 1832 identifies information on the remote UE 1810. Information of the remote UE may be identified using received relay RB information or header information (e.g., a header of an adaptation layer) included when transmitting the RRC message. In step S1836, the DU 1832 transmits the RRC message of the remote UE 1810 to the CU 1834 using the F1 or W1 message (e.g., UL RRC MESSAGE TRANSFER message). The F1 or W1 message transmitted in step S1836 is a UE-associated signaling message configured for the remote UE.

After the CU 1834 of the base station receives the INITIAL CONTEXT SETUP REQUEST message in step S1830 from the core network 1840 or after the CU 1834 receives the RRC SecurityModeComplete message transmitted by the remote UE 1810 in step 480, in step S1837, the CU 1834 transmits an F1 or W1 message (e.g., UE CONTEXT MODIFICATION REQUEST message) to the DU 1832 in order to update configuration information for communication with the relay UE 1820. The F1 or W1 message (e.g., UE CONTEXT MODIFICATION REQUEST message) transmitted in step S1837 may include RB setup/ modification information (e.g., relay radio bearer setup/ modification info) for transmission of user plane data and CP signaling (RRC message) exchanged between the base station and the remote UE 1810, relay RB mapping information (e.g., relay RB mapping config info) for transmission of user plane data of the remote UE and/or sidelink radio bearer (SL RB) setup/modification information (e.g., sidelink radio bearer setup/update) for direct communication between the relay UE 1820 and the remote UE 1810. Relay RB mapping information (e.g., relay RB mapping config info) for transmission of user plane data of the remote UE may include data radio bearer (DRB) associated with UE user plane GPRS tunneling protocol (GTP) tunnel (e.g., F1-U or W1-U GTP tunnel for each radio bearer) used between the CU 1834 and the DU 1832 for a user plane data transmission service of the remote UE and mapping information of RB for transmission of user plane data of the base station and the remote UE 1810.

In step S1837, the DU 1832 that has received context change request information for the relay UE 1820 from the CU 1834 completes configurations for the relay UE 1820 and then transmits an F1 or W1 message (e.g., UE CONTEXT MODIFICATION RESPONSE message) responding to completion of configuration for the corresponding UE to the CU 1834 in step S1838. The F1 or W1 message (e.g., UE CONTEXT MODIFICATION RESPONSE message) transmitted in step S1838 includes RB setup/modification information (e.g., RelayRBConfig IE) of the relay UE 120 for transmission of user plane data and CP signaling (RRC message) exchanged between the base station and the remote UE 1810 to be transmitted to the relay UE 1820 and/or sidelink radio bearer (SL RB) setup/modification information (e.g., SidelinkConfig IE) for direct communication between relay UE 1820 and the remote UE 1810.

The message used in step S1837 may use an example of a constitution of the UE CONTEXT MODIFICATION REQUEST message of FIGS. 8AA, 8AB, 8BA, 8BB, and 8C, and the message used in step S1838 may use an example of a constitution of the UE CONTEXT MODIFICATION RESPONSE message of FIG. 9. An identifier for distinguishing the UE in the UE-associated signaling message used in steps S1837 and S1838, for example, a gNB-CU UE F1AP ID and a gNB-DU UE F1AP ID use identifier information configured for the remote UE 1820.

In step S1838, the CU 1834 that has received a response message (e.g., UE CONTEXT SETUP RESPONSE message) to the context change request from the DU 1832 generates an RRC connection reconfiguration message (e.g., RRCReconfiguration message) including configuration information of the relay UE 1820 included in a response message to the context configuration request and then transmits the RRC message to the DU 1832 using the F1 or W1 message (e.g., DL RRC MESSAGE TRANSFER message) in step S1839.

In step S1840, the DU 1832 transmits the RRC message received from the CU 1834 in step S1839 to the relay UE 1820. The relay UE 1820 that has received an RRC connection reconfiguration message (e.g., RRCReconfiguration message) from the base station 1830 performs an internal configuration based on the information included in the message and then transmits an RRC connection reconfiguration complete message (e.g., RRCReconfigurationComplete message) to the base station 1830 in step S1841. In step S1842, the DU 1832 that has received the RRC message from the relay UE 1820 transmits the RRC message to the CU 1834 using the F1 or W1 message (e.g., UL RRC MESSAGE TRANSFER message).

For sidelink radio bearer (SL RB) for direct communication between the remote UE 1810 and the relay UE 1820 for the remote UE 1810, in step S1843, the CU 1834 transmits an F1 or W1 message (e.g., UE CONTEXT SETUP/MODIFICATION REQUEST message) including sidelink radio bearer (SL RB) setup/modification information (e.g., sidelink radio bearer setup/modification info) for direct communication between the remote UE 1810 and the relay UE 1820 to the DU 1832. The F1 or W1 message (e.g., REMOTE UE CONTEXT SETUP/MODIFICATION REQUEST message) transmitted in step S1843 is a UE-associated signaling message configured for the remote UE.

In step S1843, the DU 1832 that has received context setup/modification request information for the remote UE 1810 from the CU 1834 completes configurations for the remote UE 1810 and then transmits an F1 or W1 message (e.g., UE CONTEXT SETUP/MODIFICATION RESPONSE message) responding to completion of configuration for the corresponding UE to the CU 1834 in step S1844. The F1 or W1 message transmitted in step S1844 is a UE-associated signaling message configured for the remote UE and may include sidelink radio bearer (SL RB)

setup/modification information (e.g., SidelinkConfig IE) for direct communication between the remote UE 1810 and the relay UE 1820.

In step S1844, the CU 1834 that has received a response message (e.g., UE CONTEXT SETUP/MODIFICATION RESPONSE message) to the context change request for the remote UE 1810 from the DU 1832 generates an RRC connection reconfiguration message (e.g., RRCReconfiguration message) and then transmits the RRC message to the DU 1832 using the F1 or W1 message (e.g., DL RRC MESSAGE TRANSFER message) in step S1845. The F1 or W1 message transmitted in step S1845 is a UE-associated signaling message configured for the remote UE.

In step S1845, the DU 1832 that has received the RRC message to be transmitted from the CU 1834 to the remote UE 1810 includes identification information for distinguishing the remote UE in header information (e.g., a header of an adaptation layer) constituted to transmit the RRC message and/or transmits the information to the relay UE 1820 using relay RB in step S1846. In step S1847, the relay UE 1820 that has received the RRC message to be transmitted from the base station to the remote UE identifies the remote UE and then transmits a remote UE RRC message to the remote UE 1810 using the PC5 link.

In step S1848, the remote UE 1810 that has received an RRC connection reconfiguration message (e.g., RRCReconfiguration message) from the base station performs an internal configuration based on information included in the message, and then transmits an RRC connection reconfiguration complete message (e.g., RRCReconfigurationComplete message) to the relay UE 1820 using the PC5 link. In step S1849, the relay UE 1820 that has received the RRC connection reconfiguration complete message (e.g., RRCReconfigurationComplete message) received from the remote UE 1810 transmits the RRC connection reconfiguration complete message to the base station using the configured relay RB. In step S1849, when the DU 1832 receives the RRC message of the remote UE 1810 through the configured relay RB, the DU 1832 identifies information on the remote UE 1810. Information of the remote UE may be identified using received relay RB information or header information (e.g., header of the adaptation layer) included when transmitting the RRC message. In step S1850, the DU 1832 transmits the RRC message of the remote UE 1810 to the CU 1834 using the F1 or W1 message (e.g., UL RRC MESSAGE TRANSFER message). The F1 or W1 message transmitted in step S1850 is a UE-associated signaling message configured for the remote UE.

In step S1851, the CU 1834 identifies the RRC connection reconfiguration complete message (e.g., RRCReconfigurationComplete message) transmitted by the remote UE 110 and then transmits an INITIAL CONTEXT SETUP RESPONSE message to the core network 1840.

Figure 19:
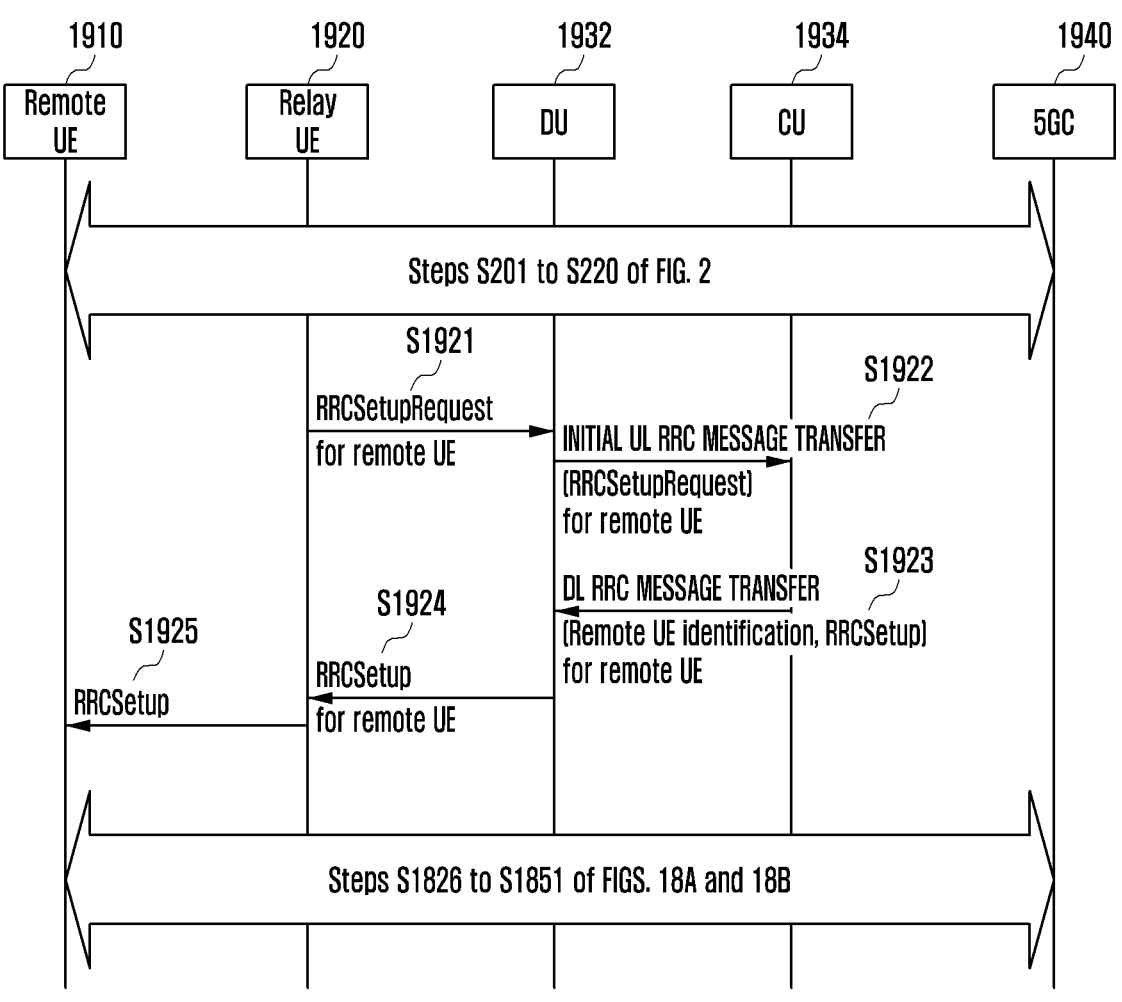
FIG. 19 is a signal flow diagram illustrating a procedure in which a CU generates and uses remote UE identifier information according to an embodiment of the disclosure.

FIG. 19 is a signal flow diagram illustrating a procedure of the case that a CU generates and uses remote UE identifier (e.g., remote UE identification) information for using for distinguishing a remote UE between the CU and a DU in a procedure of using UE-association signaling between the CU and the DU separately for a remote UE in a control information transmission method and processing method between the CU and the DU for enabling to transmit control plane signaling and user plane data between the remote UE and a base station according to an embodiment of FIG. 18.

In FIG. 19, the procedure of steps S201 to S220 of FIG. 2 is followed as it is With reference to FIG. 19, in step S1921, when a relay UE 1920 completes RRC connection establishment with a base station 1930, the relay UE 1920 transmits an RRC connection request message (e.g., RRCSetupRequest message) of a remote UE 1910 received from the remote UE 1910 to the base station using the configured relay RB. In step S1921, when a DU 1932 receives the RRC message of the remote UE 1910 through the configured relay RB, the DU 1932 identifies information on the remote UE 1910. Information of the remote UE may be identified using received relay RB information or header information (e.g., a header of an adaptation layer) included when transmitting the RRC message.

After the DU 1932 receives the RRC message of the remote UE 1910 in step S1921, in the case that the remote UE is not identified, that is, in the case that the RRC message is a first RRC message (e.g., RRCSetupRequest message) transmitted by the remote UE 1910, in step S1922, the DU 1932 generates UE-association for signal processing for a new UE, that is, the remote UE 1910 and then transmits an RRC message of the remote UE 1910 to a CU 1934 using an F1 or W1 message (e.g., INITIAL UE RRC MESSAGE TRANSFER message) including new UE-association information (e.g., new gNB-DU UE F1AP ID). The F1 or W1 message (e.g., INITIAL UE RRC MESSAGE TRANSFER message) transmitted in step S1922 is a UE-associated signaling message in an F1 or W1 interface and is used as UE-associated signaling message configured for the remote UE 1910.

In step S1922, the CU 1934 that has received the RRC connection request message (e.g., RRCSetupRequest message) transmitted by the remote UE 1910 generates an RRC connection setup message (e.g., RRCSetup message) transmitted to the remote UE 1910 and then transmits the RRC connection setup message to the DU 1932 using the F1 or W1 message (e.g., DL RRC MESSAGE TRANSFER message) in step S1923. The F1 or W1 message transmitted in step S1923 is a UE-associated signaling message configured for the remote UE 1910. In the F1 or W1 message (e.g., INITIAL UE RRC MESSAGE TRANSFER message) transmitted in step S1923, the CU 1934 may generate remote UE identifier (e.g., remote UE identification) information for using for distinguishing the corresponding remote UE 1910, and the F1 or W1 message may include remote UE identifier (e.g., remote UE identification) information.

In step S1923, the DU 1932 that has received the RRC message to be transmitted to the remote UE 1910 included in a UE-associated signaling message (e.g., DL RRC MESSAGE TRANSFER message) configured for the remote UE 1910 from the CU 1934 includes identification information for distinguishing the remote UE in header information (e.g., a header of an adaptation layer) constituted to transmit the RRC message and/or transmits the information to the relay UE 1920 using relay RB in step S1924. In step S1925, the relay UE 1920 that has received the RRC message to be transmitted from the base station to the remote UE identifies the remote UE and then transmits a remote UE RRC message to the remote UE 1910 using the PC5 link.

Thereafter, the procedure of steps S1826 to S1851 of FIGS. 18A and 18B is followed as it is.

Figure 20:
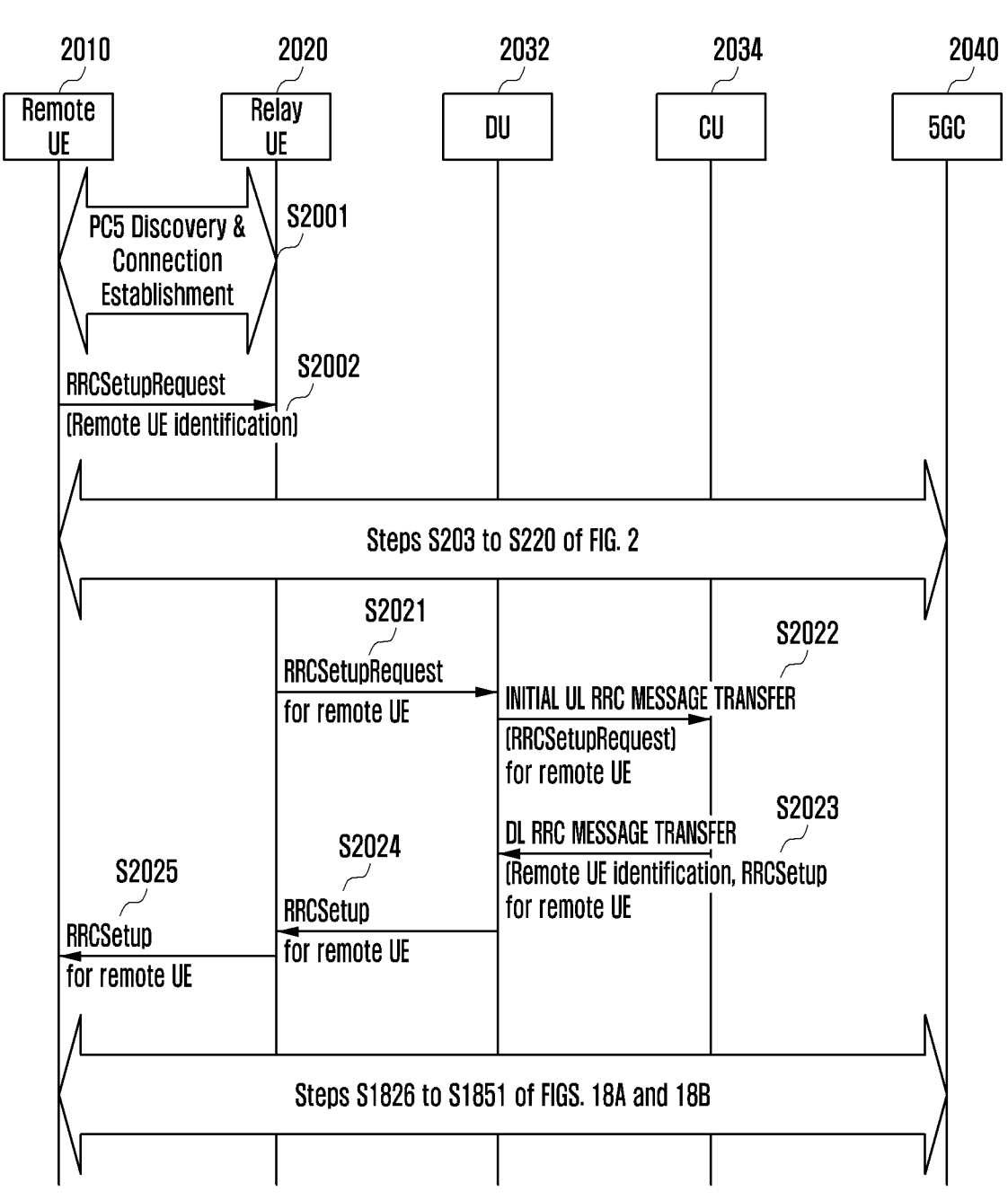
FIG. 20 is a signal flow diagram illustrating a procedure in which a remote UE generates and uses remote UE identifier information according to an embodiment of the disclosure.

FIG. 20 is a signal flow diagram illustrating a procedure of the case that a remote UE generates and uses remote UE identifier (e.g., remote UE identification) information for using for distinguishing a remote UE in relay UE-association signaling between a CU and a DU in a procedure of using UE-association signaling between the CU and the DU separately for a remote UE in a control information transmission method and processing method between the CU and the DU for enabling to transmit control plane signaling and user plane data between the remote UE and a base station according to an embodiment of FIG. 18.

With reference to FIG. 20, in step S2001, a remote UE 2010 performs a PC5 connection establishment procedure and a discovery procedure for a PC5 link connection for direct communication with a relay UE 2020. In step S2001, the remote UE 2010 may include a configuration for communicating with a base station of a mobile communication network through the relay UE 2020.

In step S2002, the remote UE 2010 transmits an RRC connection request message (e.g., RRCSetupRequest message) to be transmitted to the base station to the relay UE 2020 using the PC5 link. The RRC connection request message transmitted in step S2002 may include an identifier (e.g., remote UE identification) for distinguishing the remote UE representing the remote UE.

Thereafter, the procedure of steps S203 to S220 of FIG. 2 is followed as it is, and in step S2021, when RRC connection establishment with the base station is completed, the relay UE 2020 transmits the RRC connection request message (e.g., RRCSetupRequest message) of the remote UE 2010 received from the remote UE 2010 to the base station using the configured relay RB. In step S2021, when a DU 2032 receives the RRC message of the remote UE 2010 through the configured relay RB, the DU 2032 identifies information on the remote UE. Information of the remote UE may be identified using received relay RB information or header information (e.g., a header of an adaptation layer) included when transmitting the RRC message.

After the DU 2032 receives the RRC message of the remote UE 2010 in step S2021, in the case that the remote UE is not identified, that is, in the case that the RRC message is a first RRC message (e.g., RRCSetupRequest message) transmitted by the remote UE 2010, in step S2022, the DU 2032 generates UE-association for signal processing for a new UE, that is, the remote UE 2010 and then transmits an RRC message of the remote UE 2010 to a CU 2034 using an F1 or W1 message (e.g., INITIAL UE RRC MESSAGE TRANSFER message) including new UE-association information (e.g., new gNB-DU UE F1AP ID). The F1 or W1 message (e.g., INITIAL UE RRC MESSAGE TRANSFER message) transmitted in step S2022 is a UE-associated signaling message in an F1 or W1 interface and is used as a UE-associated signaling message configured for the remote UE 110.

In step S2022, the CU 2034 that has received the RRC connection request message (e.g., RRCSetupRequest message) transmitted by the remote UE 2010 generates an RRC connection setup message (e.g., RRCSetup message) transmitted to the remote UE 2010 and then transmits the RRC connection setup message to the DU 2032 using the F1 or W1 message (e.g., DL RRC MESSAGE TRANSFER message) in step S2023. The F1 or W1 message transmitted in step S2023 is a UE-associated signaling message configured for the remote UE 2010. The F1 or W1 message transmitted in step S2023 may include an identifier (e.g., remote UE identification) for distinguishing the remote UE included in the RRC connection request message (e.g., RRCSetupRequest message) transmitted by the remote UE 2010.

In step S2023, the DU 2032 that has received the RRC message to be transmitted to the remote UE 2010 included in a UE-associated signaling message (e.g., DL RRC MESSAGE TRANSFER message) configured for the remote UE 2010 from the CU 2034 includes identification information for distinguishing the remote UE in header information (e.g., a header of an adaptation layer) constituted to transmit the RRC message and/or transmits the information to the relay UE 2020 using relay RB in step S2024. In step S2025, the relay UE 2020 that has received the RRC message to be transmitted from the base station to the remote UE identifies the remote UE and then transmits a remote UE RRC message to the remote UE 2010 using the PC5 link.

Thereafter, the procedure of steps S1826 to S1851 of FIG. 18 is followed as it is.

FIG. 21 illustrates an example of a constitution of an F1 or W1 message (e.g., INITIAL UL RRC MESSAGE TRANSFER message) for transmitting an RRC message of the remote UE 110 used in step S1822 of FIG. 18.

The F1 or W1 message (e.g., INITIAL UL RRC MESSAGE TRANSFER message) for transmitting the RRC message of the remote UE may include message type information for distinguishing a message type and an identifier, for example, a gNB-DU UE F1AP ID for identifying the UE in UE-associated signaling established in the DU and uses identifier information configured for the remote UE as identifier information for distinguishing the UE in UE-associated signaling. In addition, the F1 or W1 message (e.g., INITIAL UL RRC MESSAGE TRANSFER message) may additionally include the following information, and names used in the embodiments may be replaced with other names.

Remote UE ID: Remote UE identification information

FIG. 22 illustrates an example of a constitution of an F1 or W1 message (e.g., DL RRC MESSAGE TRANSFER message) for transmitting an RRC message of the remote UE 110 used in step S1923 of FIG. 19 and step S2023 of FIG. 20.

The F1 or W1 message (e.g., DL RRC MESSAGE TRANSFER message) for transmitting an RRC message of the remote UE may include message type information for distinguishing a message type, an identifier, for example, a gNB-CU UE F1AP ID and a gNB-DU UE F1AP ID for distinguishing the UE in UE-associated signaling and uses identifier information configured for the remote UE as identifier information for distinguishing the UE in UE-associated signaling. In addition, the F1 or W1 message (e.g., DL RRC MESSAGE TRANSFER message) may additionally include the following information, and names used in the embodiments may be replaced with other names.

Remote UE ID: Remote UE identification information

Figure 23:
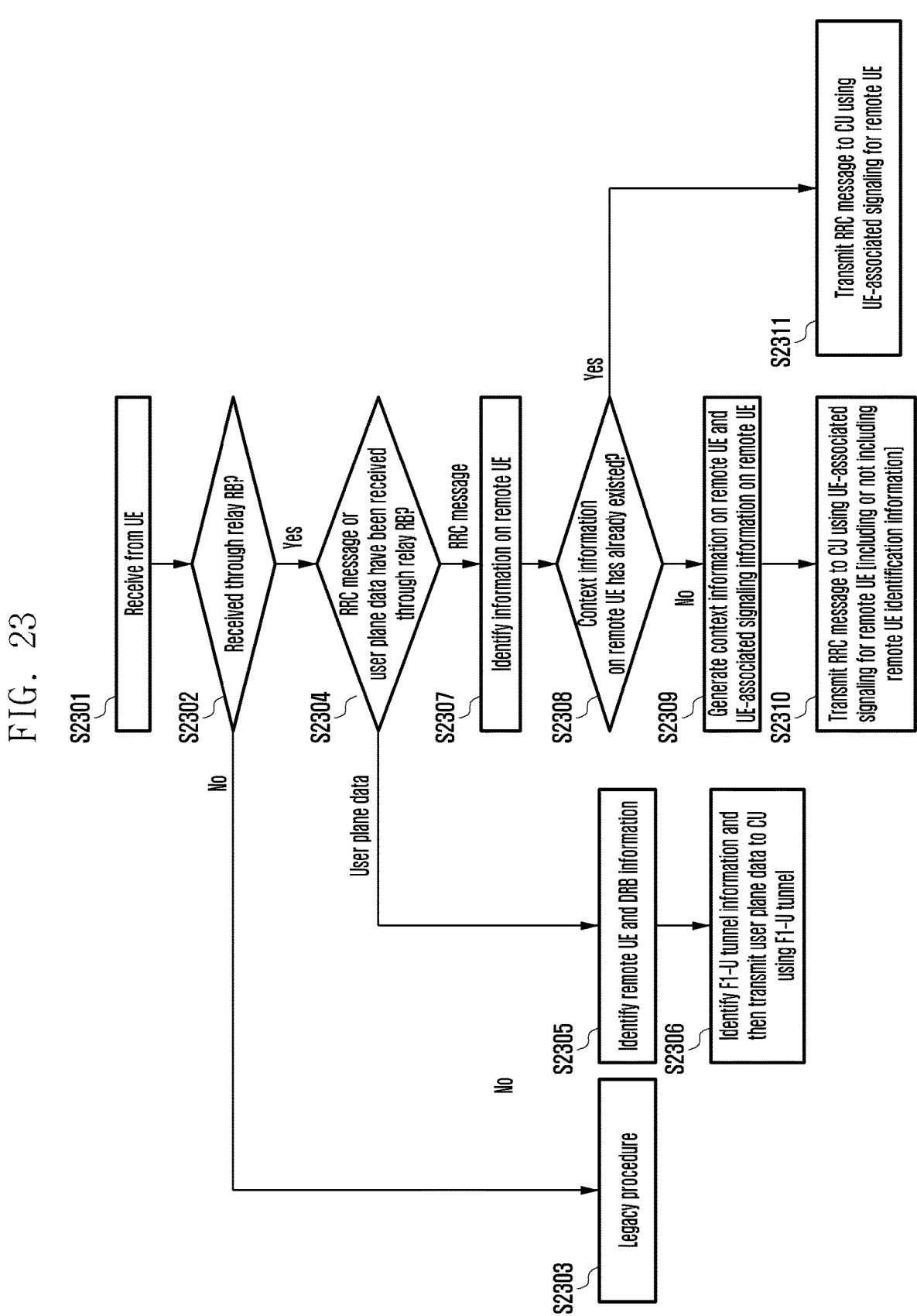
FIG. 23 is a flowchart illustrating operations and message processing in a DU when the DU of the base station receives a control message or user plane data from a relay UE according to an embodiment of the disclosure.

FIG. 23 is a flowchart illustrating operations and message processing in the DU 132 when the DU 132 of the base station according to an embodiment using UE-associated signaling for the remote UE receives control plane signaling (e.g., RRC message) or user plane data from the relay UE 120.

With reference to FIG. 23, in step S2301, when control plane signaling (e.g., RRC message) or user plane data are received from the relay UE, in step S2302, the DU 132 identifies whether control plane signaling has been received through the relay RB. If control plane signaling has not been received through the relay RB in step S2302, in step S2303, the DU 132 performs a reception procedure from the UE as in the legacy procedure. In the case that control plane signaling has been received through the relay RB in step S2302, in step S2304, the DU identifies whether control plane signaling (e.g., RRC message) or user plane data have been received through the relay RB. In the case that user plane data have been received in step S2304, in step S2305, the DU identifies information on the remote UE and data radio bearer (DRB) information using header information (e.g., a header of an adaptation layer) included when user plane data transmitted by the relay UE are transmitted. In step S2306, the DU identifies UE user plane GPRS tunneling protocol (GTP) tunnel (e.g., F1-U or W1-U GTP tunnel for each radio bearer) information used between the CU and the DU corresponding to data radio bearer (DRB) and the remote UE and then transmits user plane data to the CU using the tunnel.

In the case that control plane signaling (e.g., RRC message) has been received through the relay RB in step S2304, in step S2307, the DU identifies information on the remote UE and data radio bearer (DRB) information using header information (e.g., a header of an adaptation layer) included when control plane signaling (e.g., RRC message) transmitted by the relay UE is transmitted. In step S2308, the DU determines whether context information on the identified remote UE has already been generated and stored in the DU.

In step S2308, in the case of a newly accessed remote UE without context information on the identified remote UE, in step S2309, the DU may generate and store context information on the remote UE and UE-associated signaling information on the remote UE, and in step S2310, the DU may transmit control plane signaling (e.g., RRC message) to the CU using UE-associated signaling for the remote UE and according to the embodiment, the control plane signaling may include an identifier for the remote UE. In step S2308, in the case that context information on the identified remote UE has been already stored in the DU, in step S2311, the DU transmits control plane signaling (e.g., RRC message) to the CU using UE-associated signaling for the remote UE.

Figure 24:
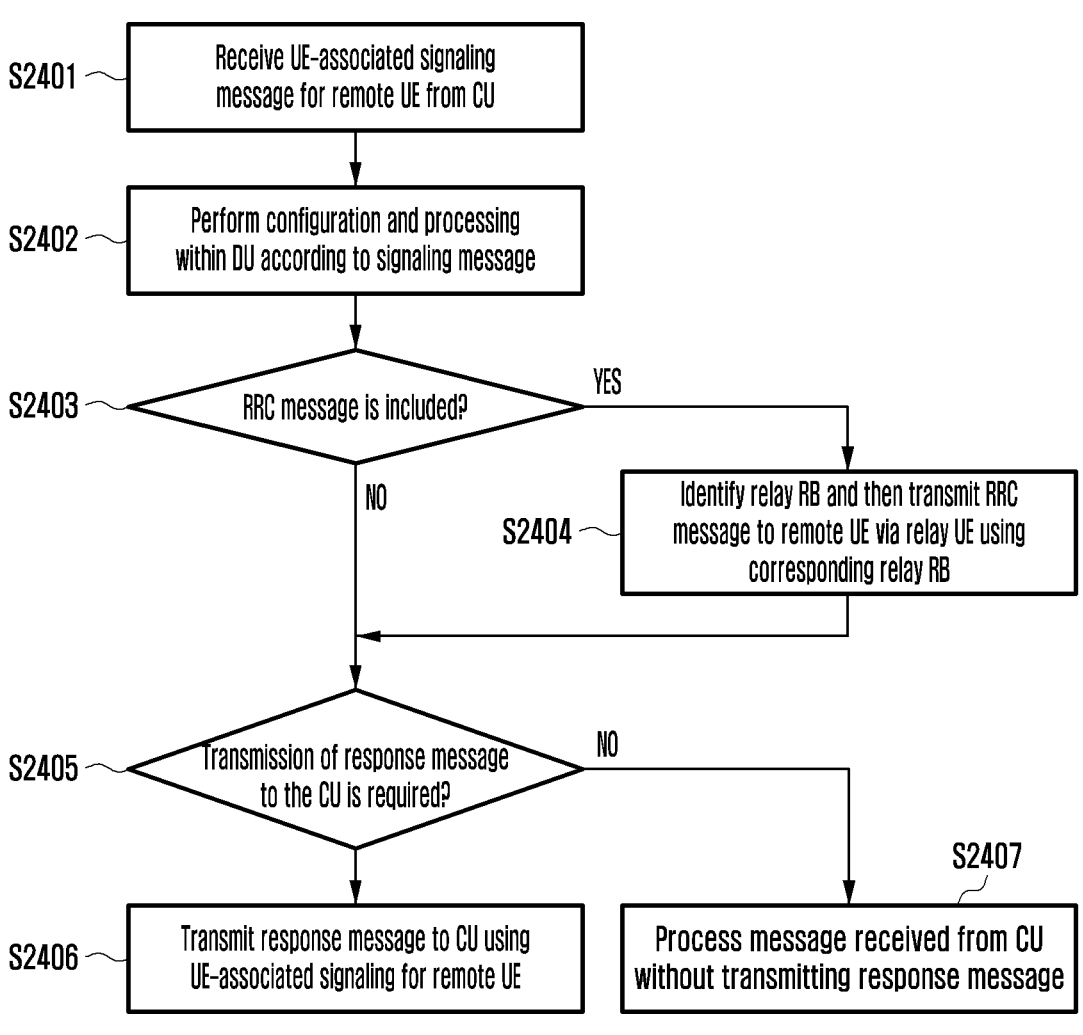
FIG. 24 is a flowchart illustrating operations and message processing in a DU when the DU of a base station receives an F1 or W1 UE-associated signaling message from a CU according to an embodiment of the disclosure.

FIG. 24 is a flowchart illustrating operations and message processing in a DU when the DU of a base station according to an embodiment of using UE-associated signaling for the remote UE receives an F1 or W1 UE-associated signaling message for the remote UE from a CU.

With reference to FIG. 24, in step S2401, the DU receives an F1 or W1 UE-associated signaling message for the remote UE, and in step S2402, the DU performs a configuration and processing within the DU according to the received message and information included in the message. In step S2403, the DU identifies whether the signaling message includes control plane signaling (e.g., RRC message) to be transmitted to the remote UE, and in the case that the signaling message includes control plane signaling, in step S2404, the DU identifies relay RB information for transmission to the remote UE, and then transmits control plane signaling (e.g., RRC message) to the remote UE via the relay UE using the corresponding relay RB. If the control plane signaling (e.g., RRC message) to the remote UE is not included in step S2403 or if transmission of the control plane signaling (e.g., RRC message) to the remote UE is completed in step S2404, in step S2405, the DU identifies whether a response message should be transmitted to the CU for the F1 or W1 UE-associated signaling message received from the CU. If transmission of a response message to the CU is required in step S2405, in step S2406, the DU transmits the corresponding response message to the CU. If transmission of a response message to the CU is not required, in step S2407, the DU performs processing of the F1 or W1 UE-associated signaling message received from the CU without transmitting a response message.

Figure 25:
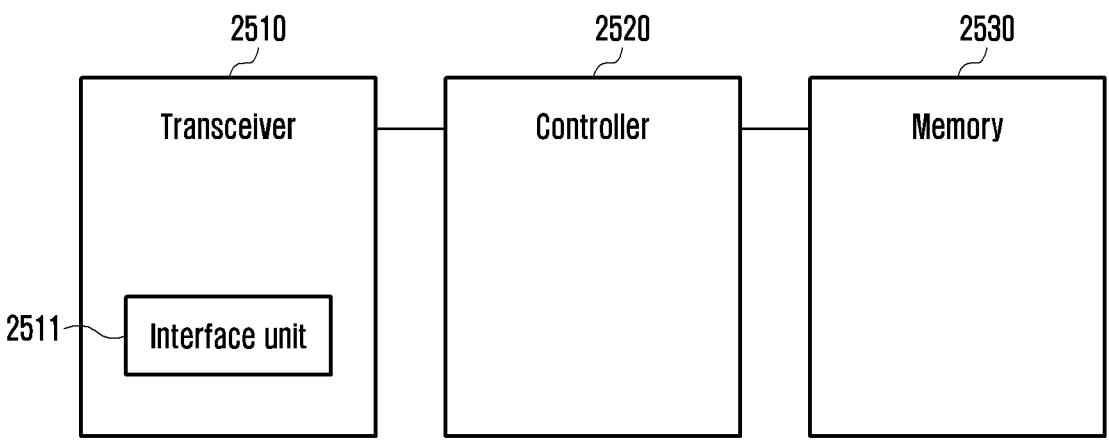
FIG. 25 is a block diagram simply illustrating a constitution of a base station according to an embodiment of the disclosure.

FIG. 25 is a block diagram simply illustrating a structure of a base station according to an embodiment of the disclosure. The base station according to an embodiment of the disclosure may include, for example, a DU of an NR base station, a CU of an NR base station, and an LTE base station. The DU and the CU may be separated by dividing a protocol stack by function within one base station, or each CU and DU may be implemented into separate base stations.

With reference to FIG. 25, the base station according to an embodiment of the disclosure may include a transceiver 2510, a controller 2520, and a memory 2530. In the disclosure, the controller 2520 of the base station may be defined as a circuit, an application specific integrated circuit, or at least one processor.

The transceiver 2510 of the base station according to an embodiment of the disclosure may transmit and receive signals to and from other network entities. For example, the transceiver 2510 may communicate with a UE, another base station, or a network functional entity using an interface unit 2511. As an example, the interface unit 2511 of the transceiver 2510 of the CU of the NR base station may include an F1-C/U interface unit for communicating with the DU of the NR base station, an Xn interface unit for communicating with other NR base stations, an X2 interface unit for communicating with the LTE base station, and an NG interface unit for communicating with the 5G core network. Further, as an example, the interface unit 2511 of the transceiver 2510 of the DU of the NR base station may include an F1-C/U interface unit for communicating with the CU of the NR base station and a radio transceiver for communicating with the UE. Further, as an example, the interface unit 2511 of the transceiver 2510 of the LTE base station may include an X2 interface unit for communicating with the CU of the NR base station.

The controller 2520 of the base station according to an embodiment of the disclosure may control the overall operation of the base station according to the embodiment proposed in the disclosure. For example, the controller 2520 may control the transceiver 2510 and the memory 2530 to perform operations according to the embodiments described in the drawings above.

More specifically, the controller 2520 of the base station according to an embodiment of the disclosure may control to transmit and process control information between the CU and the DU for enabling the base station to transmit control plane signaling and user plane data with a remote UE. Further, the controller 2520 of the base station according to an embodiment of the disclosure may control to provide related information to a core network in order to support a remote UE.

The memory 2530 of the base station according to an embodiment of the disclosure may store at least one of information transmitted and received through the transceiver 2510 or information generated through the controller 2520.

Figure 26:
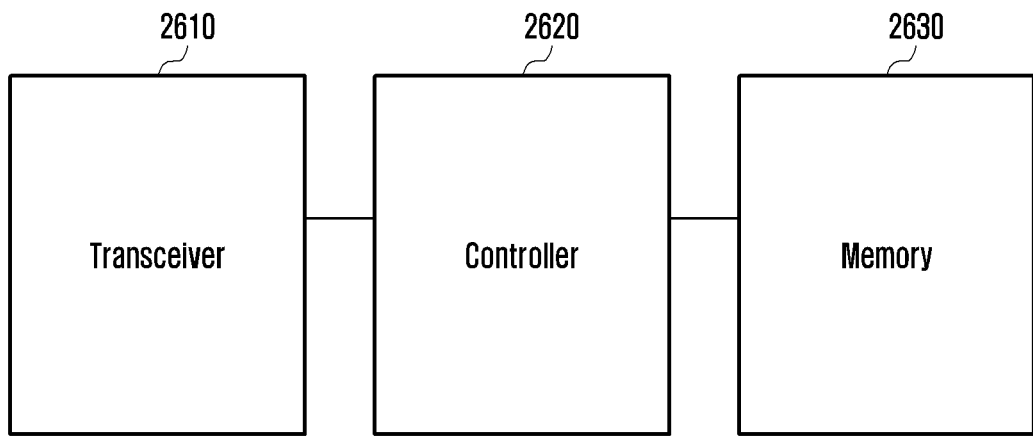
FIG. 26 is a block diagram simply illustrating a constitution of a terminal according to an embodiment of the disclosure.

FIG. 26 is a block diagram simply illustrating a structure of a UE according to an embodiment of the disclosure. The UE according to an embodiment of the disclosure may include, for example, a relay UE and a remote UE that perform an operation of the disclosure.

With reference to FIG. 26, the UE according to an embodiment of the disclosure may include a transceiver 2610, a controller 2620, and a memory 2630. In the disclosure, the controller 2620 of the UE may be defined as a circuit, an application specific integrated circuit, or at least one processor.

The transceiver 2610 of the UE according to an embodiment of the disclosure may transmit and receive signals to and from other network entities. For example, the transceiver 2610 may transmit and receive wireless signals to and from an external UE through a wireless interface, for example, a PC5 interface or transmit and receive wireless signals to and from the base station through, for example, a Uu interface.

Further, the controller 2620 of the UE according to an embodiment of the disclosure may control the overall operation of the UE according to the embodiment proposed in the disclosure. As an example, the controller 2620 of the remote UE may control to transmit an RRC connection request message to be transmitted to the base station to the relay UE, and for example, the controller 2620 of the relay UE may control to transmit the RRC connection request message received from the remote IE to the base station.

Further, the memory 2630 of the UE according to an embodiment of the disclosure may store at least one of information transmitted and received through the transceiver 2610 or information generated through the controller 2620.

Those of ordinary skill in the art to which the disclosure belongs will be able to understand that the disclosure may be implemented into other specific forms without changing the technical spirit or essential features thereof. Therefore, the embodiments described above should be understood in all respects as illustrative and not restrictive. The scope of the disclosure is indicated by the following claims rather than the detailed description above, and all changes or modifications derived from the meaning and scope of the claims and equivalent concepts thereof should be interpreted as being included in the scope of the disclosure.

In this specification and drawings, preferred embodiments of the disclosure are disclosed, and although specific terms are used, these are merely used in a general sense to easily describe the technical content of the disclosure and help the understanding of the disclosure and are not intended to limit the scope of the disclosure. In addition to the embodiments disclosed herein, it is obvious to those skilled in the art that other modifications based on the technical spirit of the disclosure may be implemented.

What is claimed is:

1. A method performed by a distributed unit (DU) of a base station in a communication system, the method comprising:
    receiving, from a relay user equipment (UE), a radio resource control (RRC) setup request message of a remote UE with header information of an adaptation layer associated with sidelink relay, wherein the header information is associated with information of the remote UE used for identifying the remote UE for the sidelink relay;
    transmitting, to a central unit (CU) of the base station, a first message including the RRC setup request message of the remote UE, a DU UE F1 application protocol (F1AP) ID for the remote UE, and the information of the remote UE; and
    receiving, from the CU of the base station, a second message based on the first message, the second message including a CU UE F1AP ID for the remote UE and an RRC setup message associated with the remote UE.

2. The method of claim 1,
    wherein the first message is an INITIAL UL RRC MESSAGE TRANSFER message,
    wherein the second message is a DL RRC MESSAGE TRANSFER message, and
    wherein the DU UE F1AP ID and the CU UE F1AP ID are used for identifying the remote UE over an F1 interface.

3. The method of claim 1,
    wherein the information of the remote UE includes at least one of an identification (ID) of the remote UE, and an ID of a radio bearer (RB) associated with the sidelink relay.

4. The method of claim 1, further comprising:

transmitting, to the remote UE via the relay UE, the RRC setup message.

5. A method performed by a central unit (CU) of a base station in a communication system, the method comprising:

receiving, from a distributed unit (DU) of the base station, a first message including a radio resource control (RRC) setup request message of a remote user equipment (UE), a DU UE F1 application protocol (F1AP) identification (ID) of the remote UE, and information of the remote UE used for identifying the remote UE for the sidelink relay;

generating an RRC setup message associated with the RRC setup request message; and transmitting, to the DU of the base station, a second message including a CU UE F1AP ID for the remote UE and the generated RRC setup message.

6. The method of claim 5, wherein the first message is an INITIAL UL RRC MESSAGE TRANSFER message, wherein the second message is a DL RRC MESSAGE TRANSFER message, and wherein the DU UE F1AP ID and the CU UE F1AP ID are used for identifying the remote UE over an F1 interface.

7. The method of claim 5, wherein the information of the remote UE includes an ID of the remote UE.

8. The method of claim 5, further comprising:

receiving, from a core network, an INITIAL CONTEXT SETUP REQUEST message including information indicating that the remote UE is authorized for the sidelink relay.

9. A distributed unit (DU) of a base station in a communication system, the DU of the base station comprising:

a transceiver; and a controller configured to:

control the transceiver to receive, from a relay user equipment (UE), a radio resource control (RRC) setup request message of a remote UE with header information of an adaptation layer associated with sidelink relay, wherein the header information is associated with information of the remote UE used for indentifying the remote UE for the sidelink relay, control the transceiver to transmit, to a central unit (CU) of the base station, a first message including the RRC setup request message of the remote UE, a DU UE F1 application protocol (F1AP) ID for the remote UE, and the information of the remote UE, and control the transceiver to receive, from the CU of the base station, a second message based on the first message, the second message including a CU UE F1AP ID for the remote UE and an RRC setup message associated with the remote UE.

10. The DU of the base station of claim 9, wherein the first message is an INITIAL UL RRC MESSAGE TRANSFER message, wherein the second message is a DL RRC MESSAGE TRANSFER message, and wherein the DU UE F1AP ID and the CU UE F1AP ID are used for identifying the remote UE over an F1 interface.

11. The DU of the base station of claim 9, wherein the information of the remote UE includes at least one of an identification (ID) of the remote UE, and an ID of a radio bearer (RB) associated with the sidelink relay.

12. The DU of the base station of claim 9, wherein the controller is further configured to control the transceiver to transmit, to the remote UE via the relay UE, the RRC setup message.

13. A central unit (CU) of a base station in a communication system, the CU of the base station comprising:

a transceiver; and a controller configured to:

control the transceiver to receive, from a distributed unit (DU) of the base station, a first message including a radio resource control (RRC) setup request message of a remote user equipment (UE), a DU UE F1 application protocol (F1AP) identification (ID) of the remote UE, and information of the remote UE used for identifying the remote UE for the sidelink relay, generate an RRC setup message associated with the RRC setup request message, and control the transceiver to transmit, to the DU of the base station, a second message including a CU UE F1AP ID for the remote UE and the generated RRC setup message.

14. The CU of the base station of claim 13, wherein the information of the remote UE includes an ID of the remote UE, wherein the first message is an INITIAL UL RRC MESSAGE TRANSFER message, wherein the second message is a DL RRC MESSAGE TRANSFER message, and wherein the DU UE F1AP ID and the CU UE F1AP ID are used for identifying the remote UE over an F1 interface.

15. The CU of the base station of claim 13, wherein the controller is further configured to control the transceiver to receive, from a core network, an INITIAL CONTEXT SETUP REQUEST message including information indicating that the remote UE is authorized for the sidelink relay.

* * * * *